United States Patent
Kim et al.

(10) Patent No.: US 8,205,231 B2
(45) Date of Patent: Jun. 19, 2012

(54) APPARATUS AND METHOD MANAGING PERSONAL SCHEDULE AND PROVIDING OVERLAPPING BROADCASTING PROGRAMS

(75) Inventors: Yong-ku Kim, Suwon-si (KR); Myong-kyun Lim, Seoul (KR); Hyo-sun Shim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1018 days.

(21) Appl. No.: 11/934,311

(22) Filed: Nov. 2, 2007

(65) Prior Publication Data

US 2008/0263596 A1 Oct. 23, 2008

(30) Foreign Application Priority Data

Apr. 17, 2007 (KR) .................. 10-2007-0037602

(51) Int. Cl.
*G06F 3/00* (2006.01)
*H04N 5/445* (2011.01)
*H04N 5/76* (2006.01)

(52) U.S. Cl. ............ 725/43; 725/58; 386/292; 386/297; 348/563; 348/564

(58) Field of Classification Search .................. 725/43, 725/46, 58; 386/292, 297; 348/563, 564
See application file for complete search history.

(56) References Cited

U.S. PATENT DOCUMENTS

| | | | |
|---|---|---|---|
| 6,151,059 A | | 11/2000 | Schein et al. |
| 2002/0151327 A1* | | 10/2002 | Levitt .......................... 455/556 |
| 2003/0046699 A1* | | 3/2003 | Nonomura et al. ............ 725/58 |
| 2003/0086694 A1 | | 5/2003 | Davidsson |
| 2005/0141855 A1 | | 6/2005 | Watanabe |
| 2006/0059521 A1* | | 3/2006 | Lee et al. ...................... 725/58 |
| 2006/0085830 A1* | | 4/2006 | Bruck et al. .................. 725/105 |
| 2006/0123449 A1* | | 6/2006 | Ma et al. ...................... 725/58 |
| 2006/0161950 A1* | | 7/2006 | Imai et al. ..................... 725/46 |
| 2007/0186243 A1* | | 8/2007 | Pettit et al. .................... 725/46 |
| 2007/0250895 A1* | | 10/2007 | Yamada ....................... 725/134 |
| 2009/0125937 A1* | | 5/2009 | Verhaegh ....................... 725/38 |

FOREIGN PATENT DOCUMENTS

| CN | 1240554 A | 1/2000 |
|---|---|---|
| CN | 1600021 A | 3/2005 |
| JP | 2003-230064 | 8/2003 |
| JP | 2005-176134 | 6/2005 |

OTHER PUBLICATIONS

Series 2—TiVo Viewer's Guide: How to activate and use your TiVo® Service.

(Continued)

*Primary Examiner* — Hoang-Vu A Nguyen-Ba
(74) *Attorney, Agent, or Firm* — Staas & Halsey LLP

(57) ABSTRACT

An apparatus for effectively managing a personal schedule and broadcasting programs includes a schedule management unit for managing a personal schedule, a broadcasting program management unit for managing basic information of broadcasting programs, an interface unit which receives an input signal, and a control unit which finds a first broadcasting program which overlaps with the personal schedule, searches for basic information for the first broadcasting program, and provides a first list including a title of the first broadcasting program, the basic information, and a display component for performing a control operation in response to an input signal.

25 Claims, 22 Drawing Sheets

OTHER PUBLICATIONS

Chinese Office Action issued Apr. 21, 2011 in corresponding Chinese Patent Application 2008100045844.
Chinese Office Action dated Dec. 6, 2011 in corresponding Chinese Application No. 2008-10004584.4.
Korean Office Action dated Nov. 28, 2011 in Korean Application No. 10-2007-0037602.
Chinese Rejection Decision for related Chinese Patent Application No. 200810004584.4, mailed on Apr. 5, 2012.

* cited by examiner

FIG. 8B

APPARATUS AND METHOD MANAGING PERSONAL SCHEDULE AND PROVIDING OVERLAPPING BROADCASTING PROGRAMS

CROSS-REFERENCE TO RELATED APPLICATION

This application claims the benefit of Korean Application No. 2007-37602, filed Apr. 17, 2007 in the Korean Intellectual Property Office, the disclosure of which is incorporated herein by reference.

BACKGROUND OF THE INVENTION

1. Field of the Invention

Aspects of the present invention relate to an apparatus and method for effectively managing a personal schedule and broadcasting programs.

2. Description of the Related Art

Recently, it has become common to manage a personal schedule by using a mobile terminal apparatus. When an IP mobile TV function is added to the mobile terminal apparatus, a user can be provided with a personal schedule and information on broadcasting programs by using the terminal apparatus. However, it is inconvenient to separately manage the personal schedule and the information on the broadcasting programs. Particularly, when a large number of broadcasting channels provide broadcasting programs, it is difficult to provide the user with suitable information on the broadcasting programs based on a changing personal schedule.

SUMMARY OF THE INVENTION

An aspect of the present invention is to provide an apparatus and method of collectively and effectively managing a personal schedule and broadcasting programs by linking a management device of the personal schedule with a system for providing information on broadcasting programs.

According to an aspect of the present invention, a method of managing a schedule and programs includes providing a personal schedule and which includes one or more non-broadcasting program events, finding a first broadcasting program which overlaps with the personal schedule, searching for a basic information for the first broadcasting program, and providing a list including a title of the first broadcasting program, the basic information, and a display component for performing a control operation related to the first broadcasting program in response to an input signal.

According to another aspect of the present invention, an apparatus for managing a schedule and programs includes a schedule management unit to manage a personal schedule including one or more non broadcasting program events, a broadcasting program management unit to manage basic information of broadcasting programs, an interface unit which receives an input signal, and a control unit which finds a first broadcasting program among the broadcasting programs which overlaps with the personal schedule managed by the schedule management unit, searches for the basic information for the first broadcasting program, and provides a list including a title of the first broadcasting program, the basic information, and a display component for performing a control operation related to the first broadcasting program and which is activated in response to the input signal.

According to another aspect of the present invention, a computer-readable recording medium having embodied thereon a computer program for executing a method of managing a schedule and programs includes providing a personal schedule and which includes one or more non-broadcasting program events, finding a first broadcasting program which overlaps with the personal schedule, searching for basic information for the first broadcasting program, and providing a list including the title of the first broadcasting program, the basic information, and a display component for performing a control operation related to the first broadcasting program in response to an input signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings of which:

FIGS. 8A and 8B illustrate a window for managing a personal schedule while executing an application for managing broadcasting programs according to another embodiment of the present invention.

DETAILED DESCRIPTION OF THE EMBODIMENTS

Figure 1:
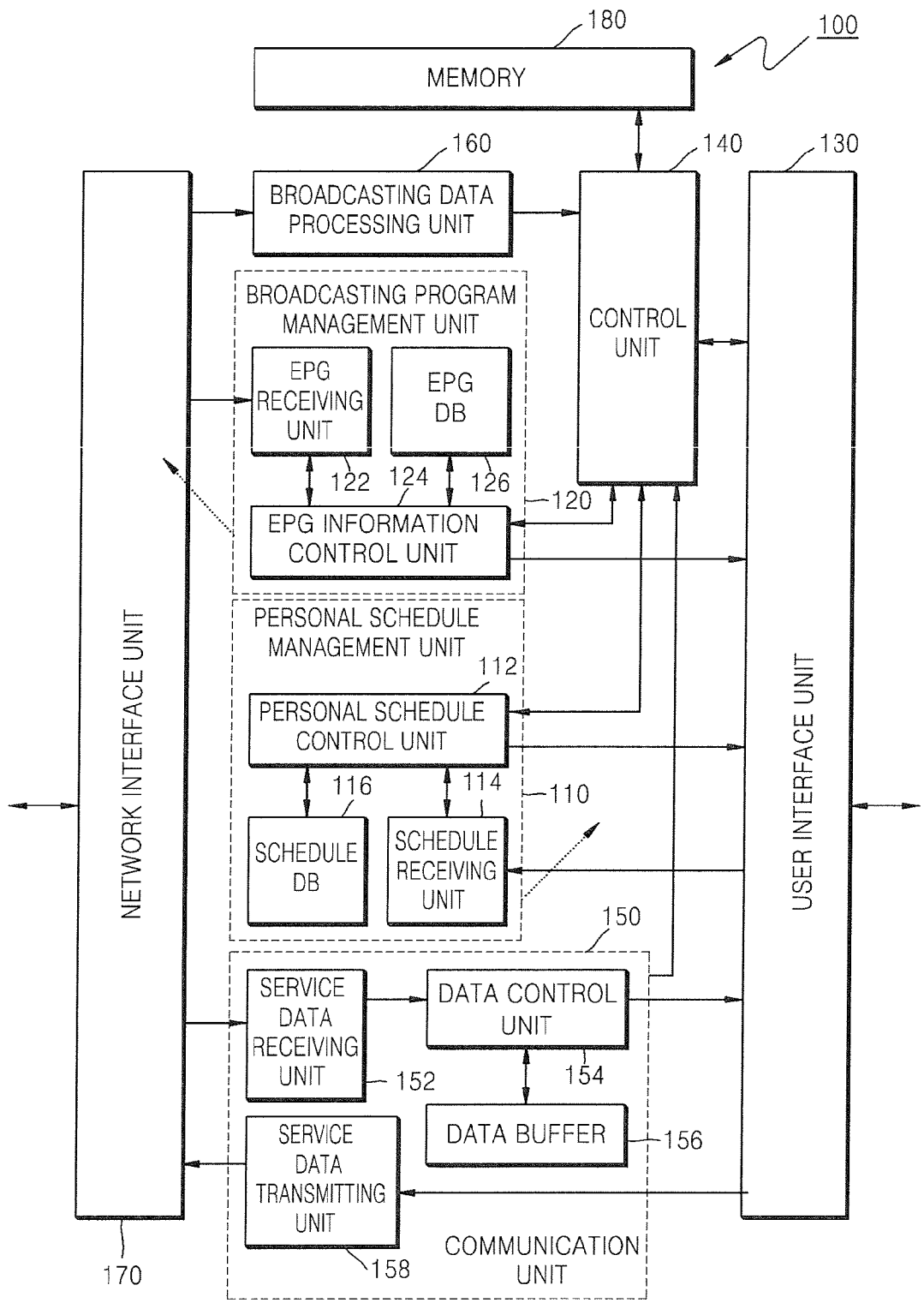
FIG. 1 is a block diagram illustrating an apparatus for managing a personal schedule and broadcasting programs according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an apparatus 100 for managing a personal schedule and broadcasting programs according to an embodiment of the present invention. The apparatus 100 for managing a personal schedule and broadcasting programs may be embodied in a variety of ways, such as, for example, a user terminal apparatus such as a personal digital assistant (PDA), portable media player, and a mobile phone capable of obtaining information on broadcasting programs or displaying contents of a broadcasting program while managing the personal schedule. Alternately, aspects can be embodied in portable computers and in non-portable computers.

The apparatus 100 includes a personal schedule management unit 110, a broadcasting program management unit 120, a user interface unit 130, a control unit 140, a communication unit 150, a broadcasting data processing unit 160, a network interface unit 170, and a memory 180. It is understood that the apparatus 100 may include other components instead of or in addition to those components shown in FIG. 1 and described below, such as an earphone jack, additional audio and video components for listening to and watching audio and video, additional memory units, additional disk drives, etc.

The personal schedule management unit serves to manage a personal schedule. According to aspects of the present invention, the personal schedule management unit 110 includes a personal schedule control unit 112, a schedule receiving unit 114, and a schedule database 116. The personal schedule includes entries corresponding to designated times, for example, an entry corresponding to a meeting time, an entry corresponding to a deadline, etc.

When the schedule receiving unit 114 receives an input of a personal schedule from the user interface unit 130, the schedule control unit stores the received information of the personal schedule in the schedule database 116. The personal schedule control unit 112 searches the schedule database 116 in response to a request transmitted via the user interface unit 130 for outputting the information of the personal schedule, and provides the matching information of the personal schedule to the control unit 140. The control unit 140 constructs a display window for providing the matching information of the personal schedule to the user. Examples of such requests are to display a personal schedule for a day, a week, or for availability for a meeting.

The broadcasting program management unit 120 serves to manage broadcasting programs. According to aspects of the present invention, the broadcasting program management unit 120 includes an Electronic Program Guide (EPG) receiving unit 122, an EPG information control unit 124, and an EPG database 126.

The EPG receiving unit 122 receives information on broadcasting programs transmitted via a two-way communication network. According to an aspect of the present invention, the EPG receiving unit 122 is constructed so as to receive information on the broadcasting programs transmitted through a broadcasting network (such as an IPTV compatible network). The EPG information control unit 124 stores the received information on the broadcasting programs in the EPG database 126. In addition, the EPG information control unit 124 provides the information on the broadcasting programs to the control unit 140 in response to the request of the user. The control unit 140 constructs a display window for providing the matching information on the broadcasting programs to the user.

The user interface unit 130 receives an input command from the user and transmits the input command to the control unit 140. According to aspects of the present invention, the user interface unit 130 may be embodied in various ways, such as, for example, a shape of a touch pad, a panel of buttons, a remote control used with the apparatus 100, or a combination thereof, through which an input command of the user is received. In FIG. 1, it is assumed that the user interface unit 130 has a shape of a touch pad combined with a screen of a display device. However, it is understood that the display can be separate from the touch pad in other aspects. Moreover, the display need not be integral to the apparatus 100, such as when the apparatus 100 is connectable to the display.

According to an aspect of the present invention, the control unit 140 controls operations of the apparatus 100 in response to an input signal of the user. The control unit 140 searches for at least one broadcasting program which overlaps with designated times in the personal schedule by using the information on the broadcasting programs and the information of the personal schedule which are respectively received from the broadcasting program management unit 120 and the personal schedule management unit 110. The control unit 140 generates a broadcasting program list including the information about at lest one broadcasting program which overlaps with designated times in the personal schedule, including, for example, a title of the at least one broadcasting program and basic information about the at least one broadcasting program. Then, the control unit 140 constructs and provides a display window for displaying at least one list with information pertaining to a personal schedule and a broadcasting program list based on the personal schedule. In addition, the control unit 140 updates the broadcasting program list by generating the broadcasting program list including the information on broadcasting programs which overlap with a changed personal schedule, whenever the received personal schedule is changed. The designated times can be specific times reserved for watching TV, or merely times when no personal schedule exists, such as between meetings or events.

The control unit 140 is enabled to perform operations corresponding to the information on the broadcasting programs. According to aspects of the present invention, the control unit 140 provides the information on a broadcasting program included in the broadcasting program list together with software for performing a control operation based on an input of the user. The control unit 140 may include, for example, icons, symbols, numbers, or other visual representations that are displayed together with the broadcasting program list which a user selects to perform a control operation, such as watching the broadcasting program. When the user terminal apparatus 100 provides the information on the broadcasting program, since the control unit 140 has components, such as icons, to perform operations related to the broadcasting program, the user is provided with the information on the broadcasting program, and the user performs the operations related to the broadcasting program by using the components, such as the icons, for performing the operations related to the broadcasting program through a selection or a series of selections. It is understood that the control unit 140 may be designed to receive a user command in many different ways other than using icons for a manual selection process, such as by remote control, etc.

According to an aspect of the present invention, when an input signal for selecting one broadcasting program from the broadcasting program list is received from the user interface unit 130, the control unit 140 provides detailed information on the selected broadcasting program. The control unit 140 requests for the EPG information control unit 124 to provide the detailed information on the selected broadcasting program. The EPG information control unit 124 searches the EPG database 126 in response to the request of the control unit 140 and transmits the corresponding detailed information to the control unit 140. Accordingly, the control unit 140 obtains the detailed information for the selected broadcasting program. However, it is understood that the control unit 140 is not required to provide detailed information on the selected broadcasting program, and may instead automatically perform operations on the selected broadcasting program such as setting reminders in the personal schedule to watch the program or by setting a recording operation to record the show.

According to an aspect of the present invention, the list for representing the personal schedule includes a daily list and a monthly list. When a user inputs an input signal selecting a past schedule, the control unit 140 provides detailed information on the selected schedule and information on the broadcasting programs which overlap with the detailed schedule information. At this time, the information on the broadcasting program may be provided together with the components, such as the icons, for performing the control operation based on the input of the user. It is understood that the list representing the personal schedule is not limited to displaying a daily list and a monthly list, and may instead supply other lists, such as weekly lists, yearly lists, or lists ranging a period of time determined by a user. Moreover, the overlap can be limited to times in which events are not occurring.

The apparatus 100 for managing the personal schedule and the broadcasting programs further includes the broadcasting data processing unit 160 for receiving and processing broadcasting data. Thus, the apparatus 100 is enabled to process and provide broadcasting data to the user.

According to an aspect of the present invention, the control unit 140 performs an operation of recording the broadcasting program as the control operation in response to the input of the user by controlling the broadcasting data processing unit 160. The operation of recording the broadcasting program may be performed in a variety of ways. For example, a command may be input to automatically record the entire broadcasting program, or another command may be input to manually start recording the broadcasting program. The control unit 140 records the received broadcasting program in the memory 180 by controlling the broadcasting data processing unit 160. The memory 180 may be various types, such as flash media, magnetic media, or optical recording media. The memory 180 can also be detachable, as in an SD card.

According to an aspect of the present invention, when providing a list of broadcasting programs, the control unit 140 provides information on whether each of the broadcasting programs included in the broadcasting program list overlaps with the personal schedule and information on whether each of the broadcasting programs have been recorded. When a broadcasting program has been already recorded, the control unit 140 further provides an icon enabling the user to delete the broadcasting program.

The communication unit 150 communicates with a server (not shown) which may provide various services, such as, for example, at least one service of a comment service on the broadcasting program or a video on demand (VOD) service related to the broadcasting program through a communication network in response to the control of the control unit 140. The control unit 140 performs at least one operation of an operation of providing the comment service on the broadcasting program or an operation of providing the VOD service related to the broadcasting program through communication with the server, as a control operation in response to an input command input by the user.

The communication unit 150 includes a service data receiving unit 152, a data control unit 154, a data buffer 156, and a service data transmitting unit 158. When information including, for example, an identification code (ID) and a password used for accessing the server, is input, the service data transmitting unit 158 transmits the input information to the server. The service data receiving unit 152 receives information needed for providing services, such as the VOD service or comment service, from the server, and transmits the received information to the data control unit 154. The data control unit 154 processes the information needed for providing the VOD service or comment service and provides the processed information to the user. Alternatively, the data control unit 154 transmits the information needed for providing the VOD service or comment service to the control unit 140. The control unit 140 then constructs a display window for the VOD service or comment service, thereby enabling the user to use the service.

According to an aspect of the present invention, the operation of providing the comment service on the broadcasting program includes operations of obtaining reviews or comments on the broadcasting program by accessing the server which provides the comment service on the broadcasting program and providing the display window so as to allow the user to input a comment or review in addition to merely reading the comments of others. According to an aspect, the network interface unit 170 is used to access the server. The input comment is transmitted to the server for providing the comment service to be managed.

Also, according to an aspect of the present invention, the operation of providing the VOD service related to the broadcasting program includes an operation of providing a VOD service list used for selecting the VOD service related to the broadcasting program. When providing the VOD service list, the VOD service list further includes information on whether the broadcasting programs corresponding to the information on the broadcasting program included in the VOD service list are stored in the apparatus 100. When the information on the broadcasting programs included in the VOD service list indicates that the broadcasting programs are not stored in the apparatus 100, the control unit 140 provides a service to be used for purchasing a VOD corresponding to the broadcasting program that is not stored in the apparatus 100.

Hereinafter, referring to FIGS. 2A to 6D, a method of displaying information on broadcasting programs using a display window in which an application for managing a personal schedule is executed is described. Referring to FIGS. 7A to 8B, a method of displaying a personal schedule using a display window in which an application for managing information on broadcasting programs is executed is described. The display window for displaying the personal schedule and the information on the broadcasting programs according to aspects of the present invention is constructed using a display component for displaying information on management of the personal schedule and a display component for displaying the information on the broadcasting programs.

Figure 2A:
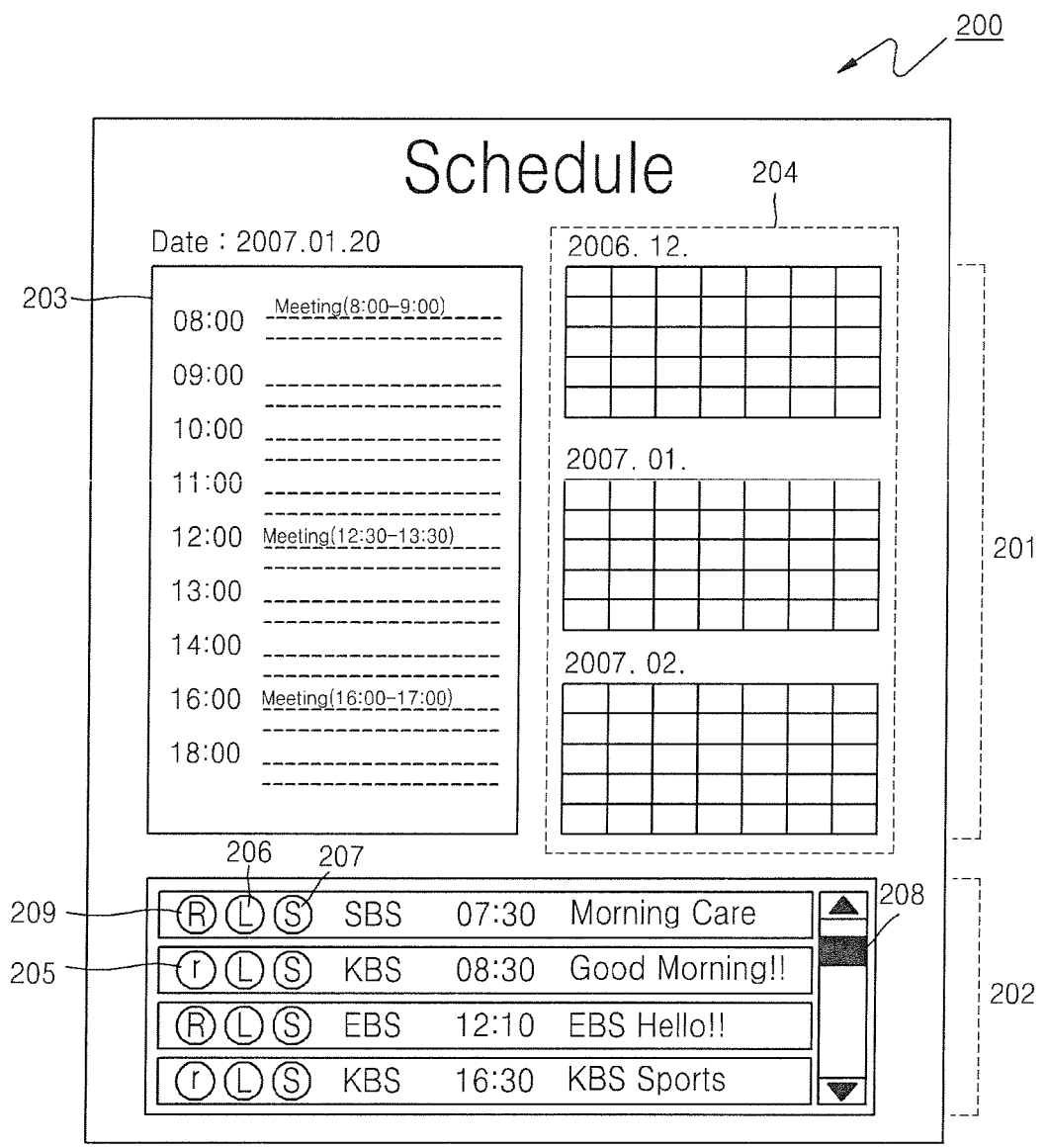
FIGS. 2A to 2C illustrate a window for managing a personal schedule and broadcasting programs according to an embodiment of the present invention.
Figure 2B:
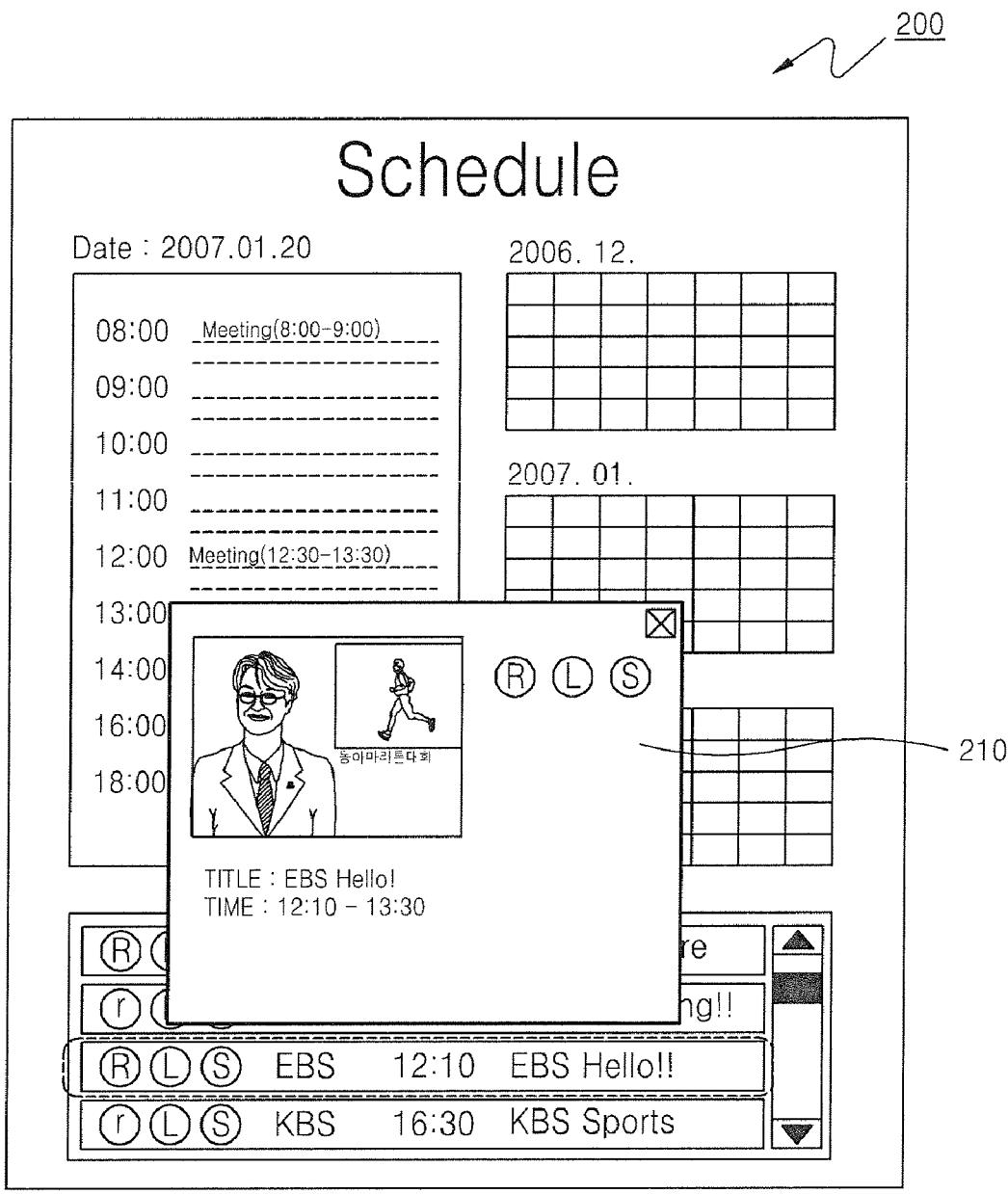
Figure 2C:
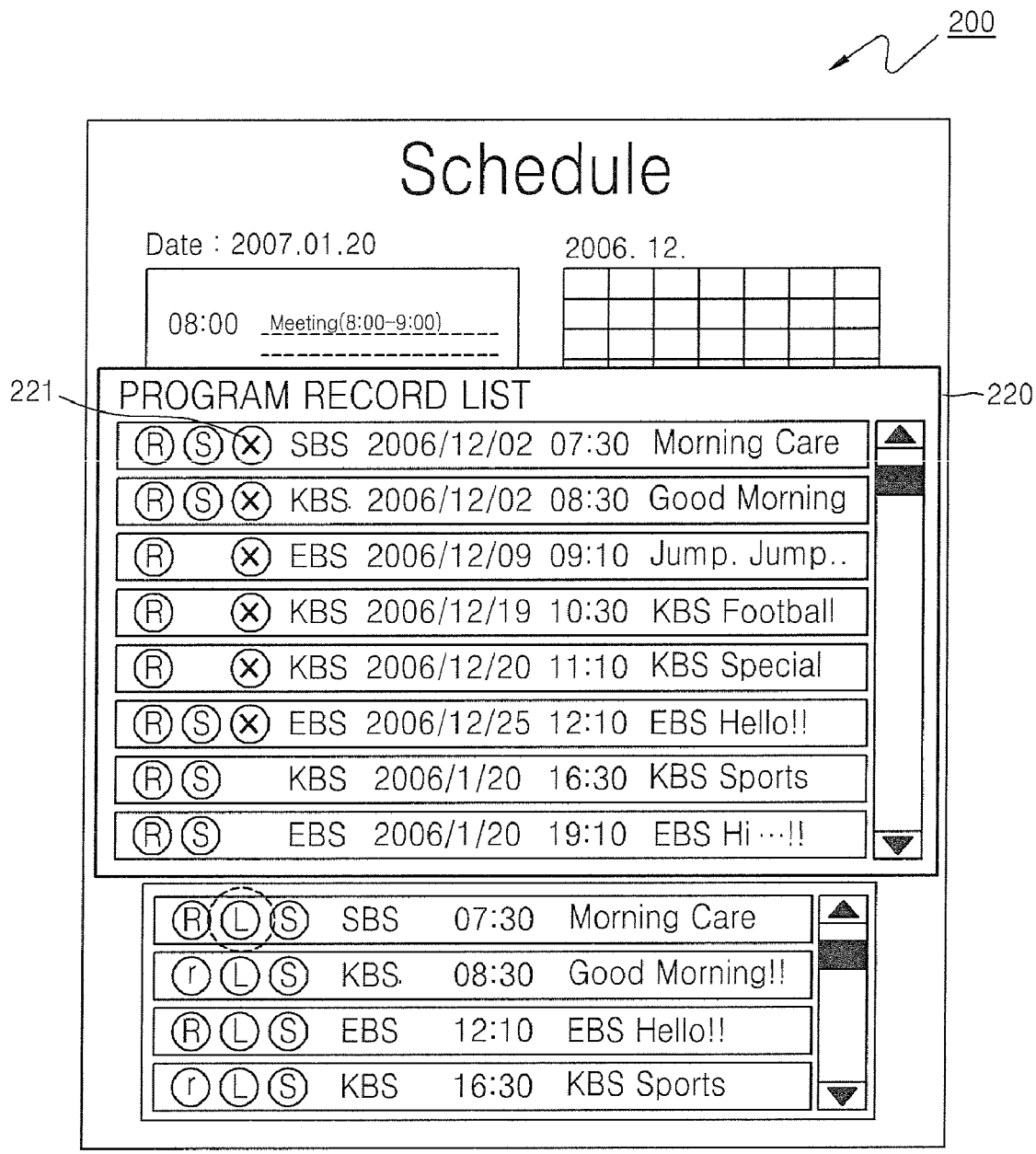

FIGS. 2A, 2B and 2C illustrate a window 200 for managing a personal schedule and broadcasting programs according to an embodiment of the present invention. In the window 200 shown in FIG. 2A, a program for managing a personal schedule in the apparatus 100 is executed. The window 200 shown in FIG. 2A is constructed with a display component for displaying a personal schedule including a daily personal schedule 203, a monthly personal schedule 204, and a broadcasting program list 202. The broadcasting program list 202 includes information on the broadcasting programs, such as titles, etc., which overlap with the daily personal schedule 203. The user can input the next schedule after positioning a cursor on the daily personal schedule 203. It is understood the window 200 is not limited to displaying the daily personal schedule 203 and the monthly personal schedule 204, and may instead display schedules corresponding to other periods of time, such as weekly schedules, yearly schedules, etc. Further, both schedules 203 and 204 need not be simultaneously displayed with the broadcasting program list 202, and the relative arrangement of the schedules 203, 204, and the list 202 can be other than as shown.

The broadcasting program list 202 is changed in correspondence with the changed daily personal schedule 203 whenever the displayed daily personal schedule 203 is changed in real time. When a date or time corresponding to the displayed daily personal schedule 203 is changed, the broadcasting program list 202 of broadcasting programs which overlap with the changed date or time is displayed.

According to an aspect of the present invention, the monthly personal schedule 204 has a calendar form shown in FIG. 2A, including three calendar forms from the previous month to the next month based on the present month. When the user selects a date from the monthly personal schedule 204, a personal schedule of the selected date is displayed on the daily personal schedule 203 so as to allow the user to edit the personal schedule. However, the monthly personal schedule 204 can have other numbers of monthly forms, and can be limited to a single month in other aspects.

According to an aspect of the present invention, the broadcasting program list 202 provides basic information on the broadcasting programs, such as titles, etc., which overlap with the personal schedule. In FIG. 2A, the broadcasting program list 202 displays information on the broadcasting programs including broadcasting channels, broadcasting times, and titles of the broadcasting programs. According to aspects of the present invention, the information on the broadcasting programs, which includes display components for performing a control operation in response to an input of the user, is displayed so as to allow the user to perform operations related to the broadcasting programs. According to aspects of the present invention, as shown in FIG. 2A, the display components for performing the control operation in response to the input of the user are icons displayed together with the broadcasting program list. In FIG. 2A, R, L, and S icons are provided, and operations thereof are described below.

An R icon 209 indicates that a recording operation is reserved to record a broadcasting program. Selecting the R icon 209 cancels the reserved recording operation. The user can reserve a recording operation or can cancel the reserved recording operation before performing the recording operation by using the R icon 209. The user may also stop the recording operation during the recording operation. When the R icon 209 is selected to cancel the recording operation, the R icon 209 is changed into an r icon 205. It is understood other types of icons can be used instead of the R icon 209.

The r icon 205 indicates that a recording operation is not reserved. Selecting the r icon 205 reserves a recording operation for the corresponding broadcasting program. According to an aspect of the present invention, when the recording operation is completed, the color of the R icon 209 is changed. Aspects of the present invention may be designed so that the recorded broadcasting program cannot be deleted by using the R icon 209. It is understood that other types of icons can be used instead of the r icon 205, and that other visual cues may be used instead of changing the color of the R icon 209 to indicate that a recording operation is completed.

An L icon 206 is used to switch the current display window 200 to a display window (not shown) for displaying a list of each of the reserved recording operations. Aspects of the present invention may be designed so that the list of each of the broadcasting programs is displayed on the display window when the user selects the L icon 206. It is understood that other types of icons may used instead of the L icon 206.

An S icon 207 represents whether designated times in a personal schedule overlap with broadcasting times of the broadcasting programs. When the S icon 207 is displayed, the S icon indicates that a designated time in the personal schedule overlaps with the broadcasting time of the corresponding broadcasting program. When the S icon 207 is not displayed, the absence of the S icon indicates that the designated times in the personal schedule do not overlap with the broadcasting time of the corresponding broadcasting program.

When the list of the broadcasting programs 202 which overlap with the personal schedule is displayed on the window 200 and when there are many broadcasting programs in the list to be displayed on the window, a scrollbar 208 is displayed to scroll up and down the list 202.

FIG. 2B illustrates a window 210 on which detailed information corresponding to the selected broadcasting program is displayed, when receiving an input signal of the user for selecting one broadcasting program included in the broadcasting program list 202 of FIG. 2A. As shown in FIG. 2B, icons which are display components for performing a control operation in response to the input of the user for the broadcasting program are also displayed on the window 210 on which the detailed information is displayed.

FIG. 2C illustrates a window 220 for displaying a list of reserved recording operations provided for the user terminal apparatus 100. The window 220 is displayed when the L icon 206 included in the information on a broadcasting program included in the broadcasting program list 202 of FIG. 2A is pressed or selected. In the window 220, an X icon 221 is used to delete the broadcasting program which is completely recorded. Aspects of the present invention are designed so that the broadcasting program which is completely recorded is deleted by pressing the X icon, not the R icon.

Figure 3A:
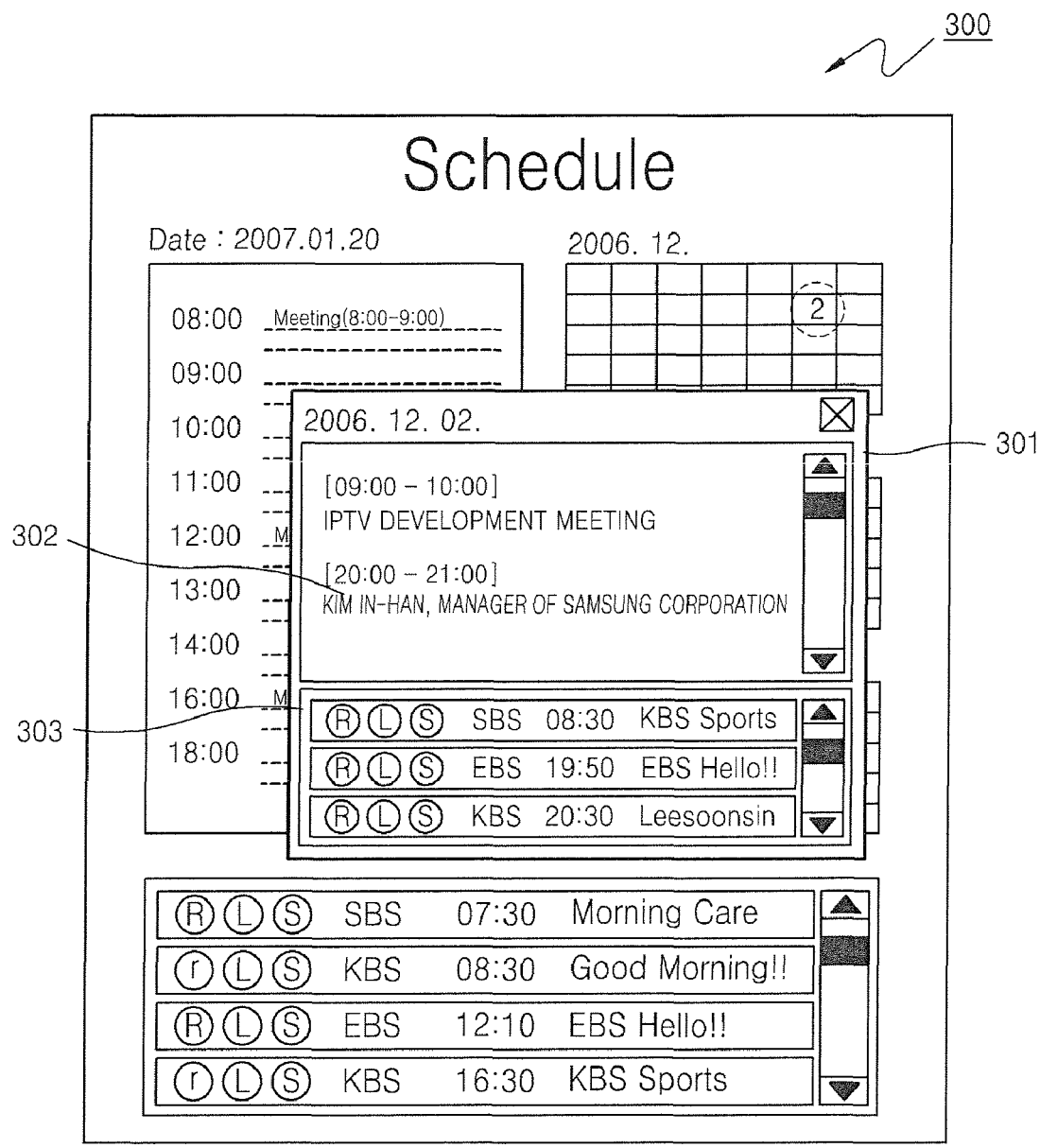
FIGS. 3A to 3D illustrate a window for managing a personal schedule and broadcasting programs according to another embodiment of the present invention.

FIGS. 3A, 3B, 3C and 3D illustrate a window 300 for managing a personal schedule and broadcasting programs according to another embodiment of the present invention. FIG. 3A illustrates a window 300 displayed by the apparatus 100 when receiving an input signal input by the user for selecting a predetermined date from the monthly personal schedule 204. When receiving an input signal from the user for selecting a predetermined past date, a window 301 including a past scheduling 302 of the date selected by the user and a broadcasting program list 303 including information on broadcasting programs which overlap with the past schedule are displayed.

Figure 3B:
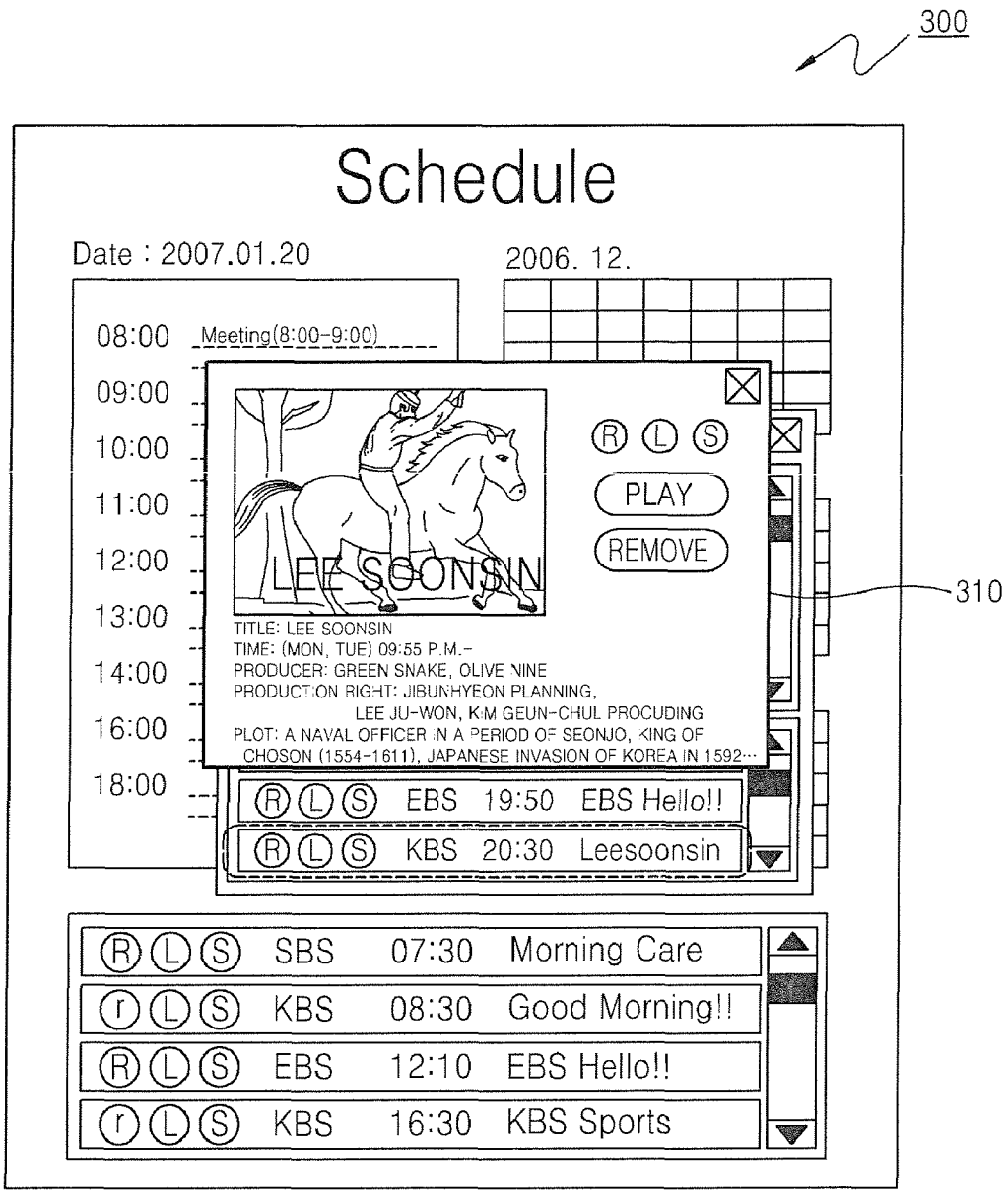

FIG. 3B illustrates a window 310 displayed when receiving an input signal from the user for selecting one broadcasting program included in the broadcasting program list 303 including the information on the broadcasting programs which overlap with the past schedule of the window 301 of FIG. 3A. When receiving an input signal from the user for selecting one broadcasting program included in the broadcasting program list 303, the apparatus 100 displays a window 310 on which detailed information on the selected broadcasting program is displayed. The window 310 on which the detailed information is displayed includes the R icon 209 for representing whether a corresponding broadcasting program is recorded, the L icon 206 for displaying a broadcasting program list, and the S icon 207 for representing whether the selected broadcasting program overlaps with a personal schedule. In addition, the window 310 further includes a play icon for reproducing a recorded program and a remove icon for deleting a recorded program.

Figure 3C:
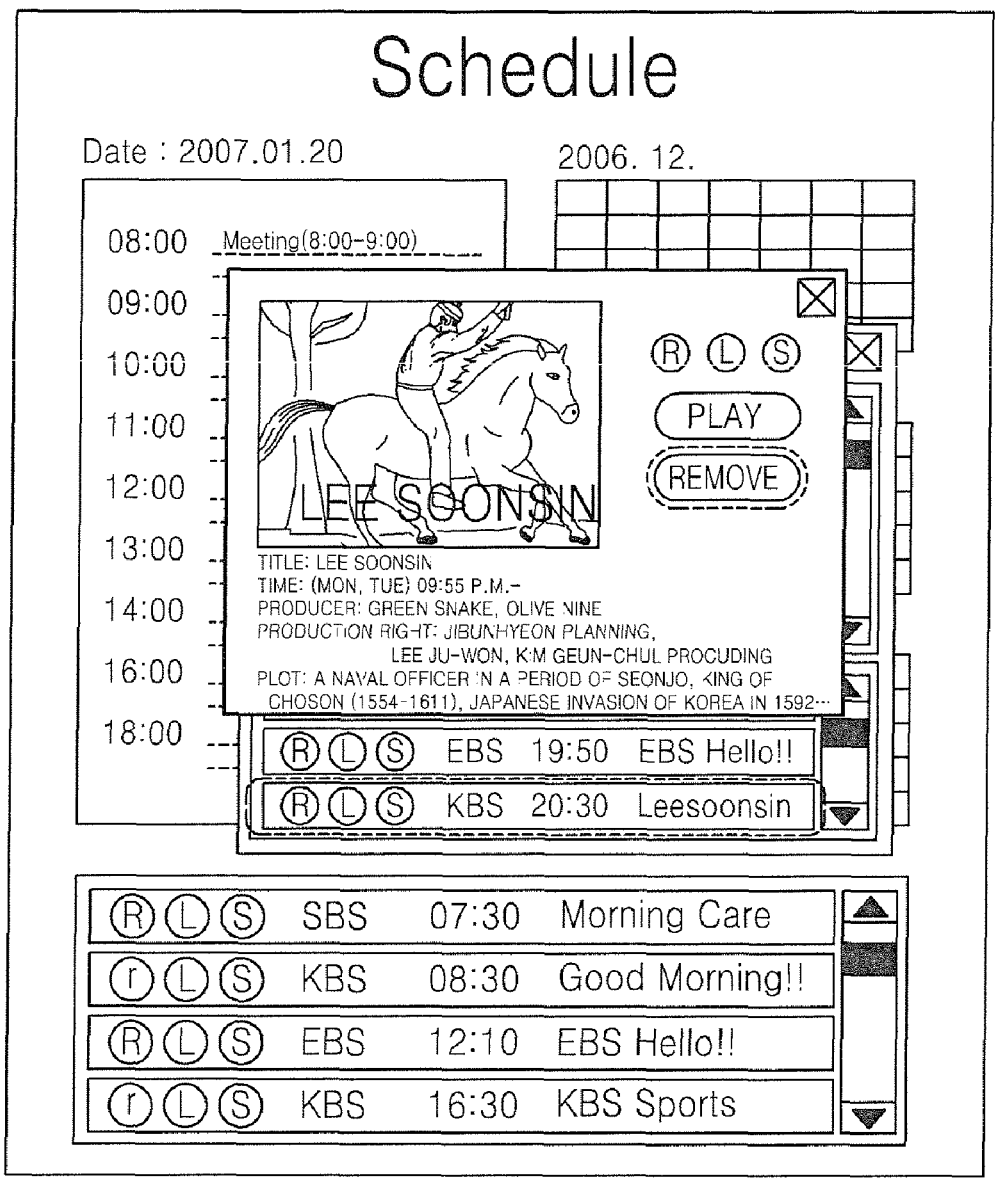
Figure 3D:
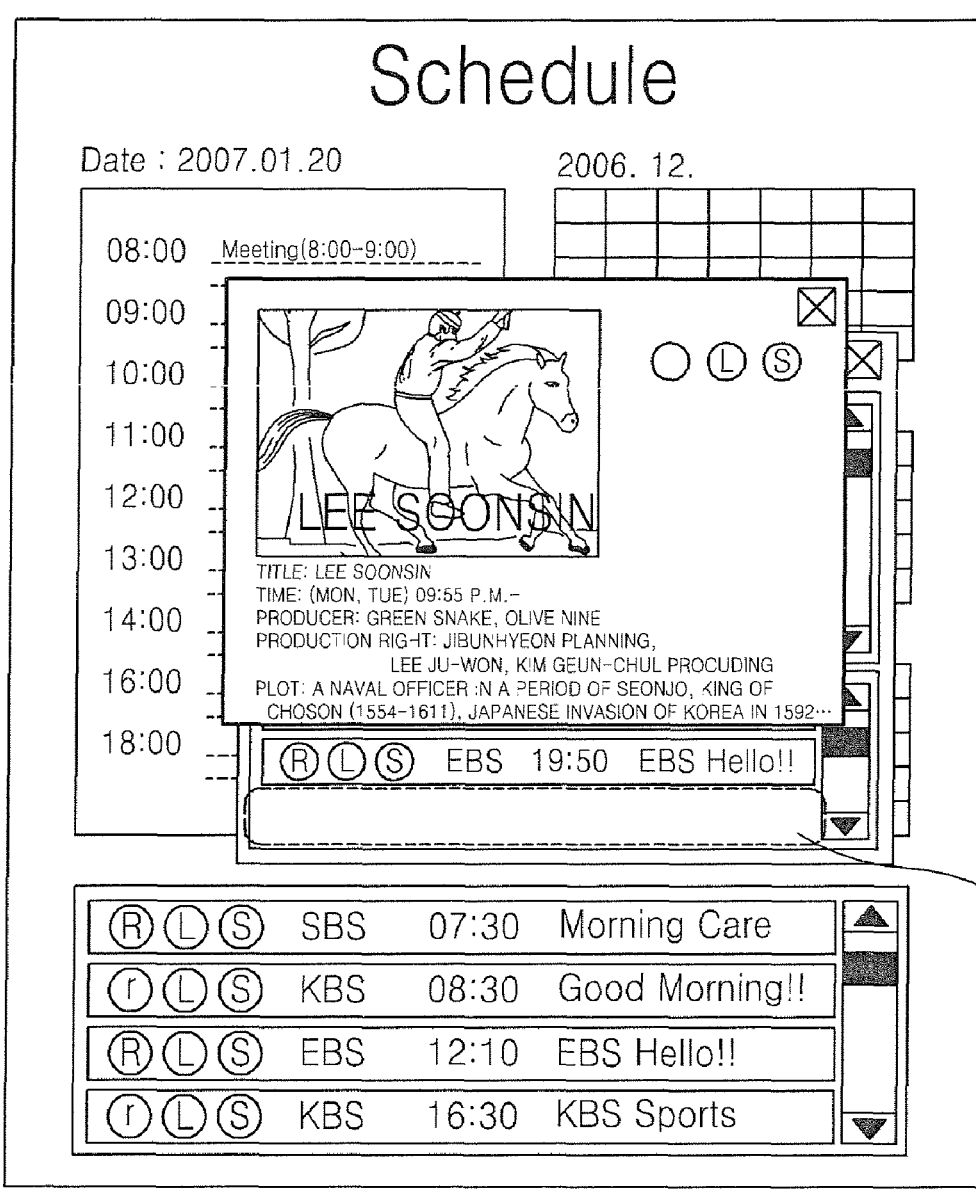

FIG. 3C illustrates a state in which the user presses the remove icon in the window 310. As shown in FIG. 3D, when the user selects the remove icon, an item representing the deleted broadcasting program is removed from the broadcasting program list 303 as illustrated by reference numeral 330.

Figure 4A:
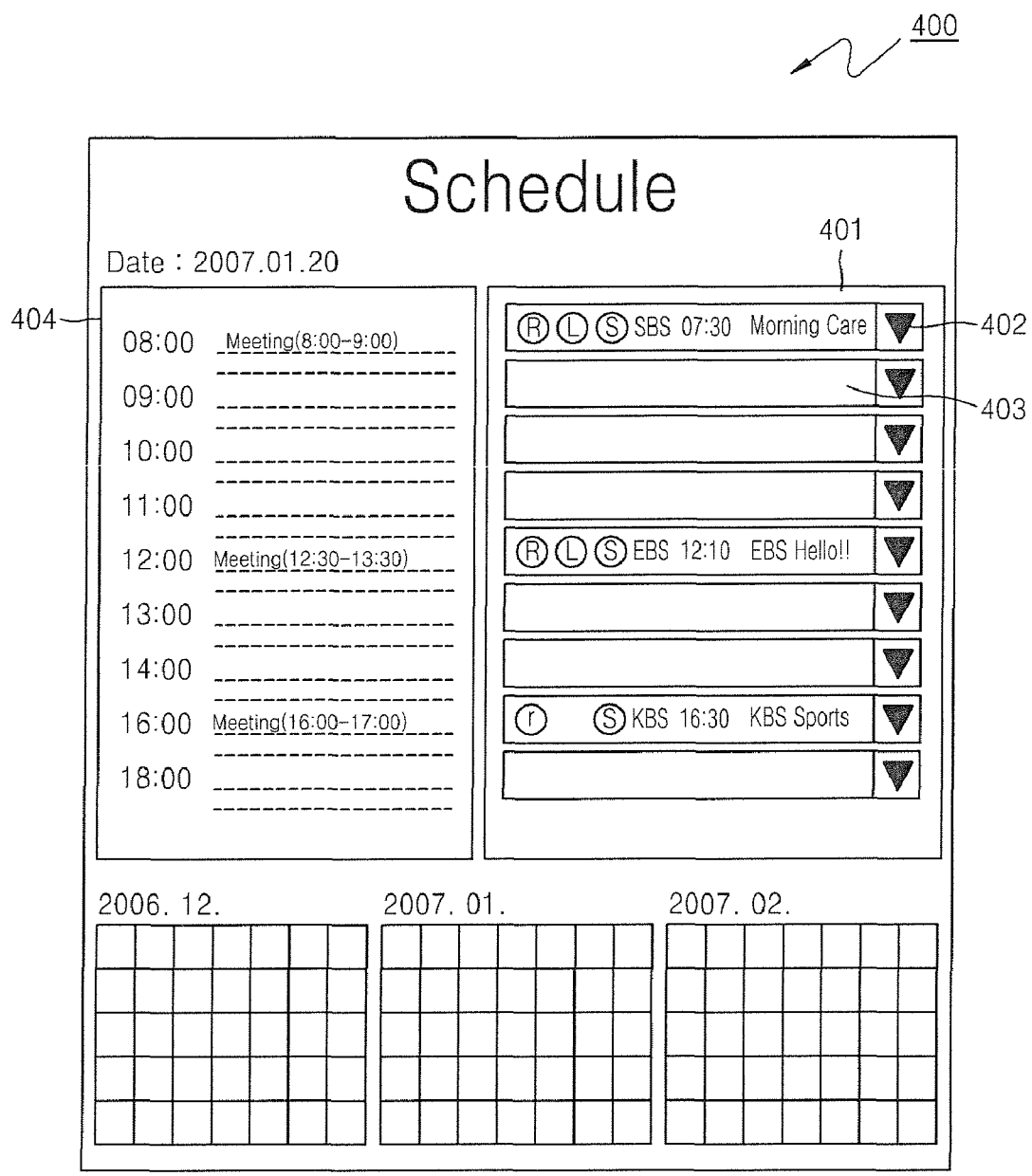
FIGS. 4A and 4B illustrate a window for managing a personal schedule and broadcasting programs according to still another embodiment of the present invention.
Figure 4B:
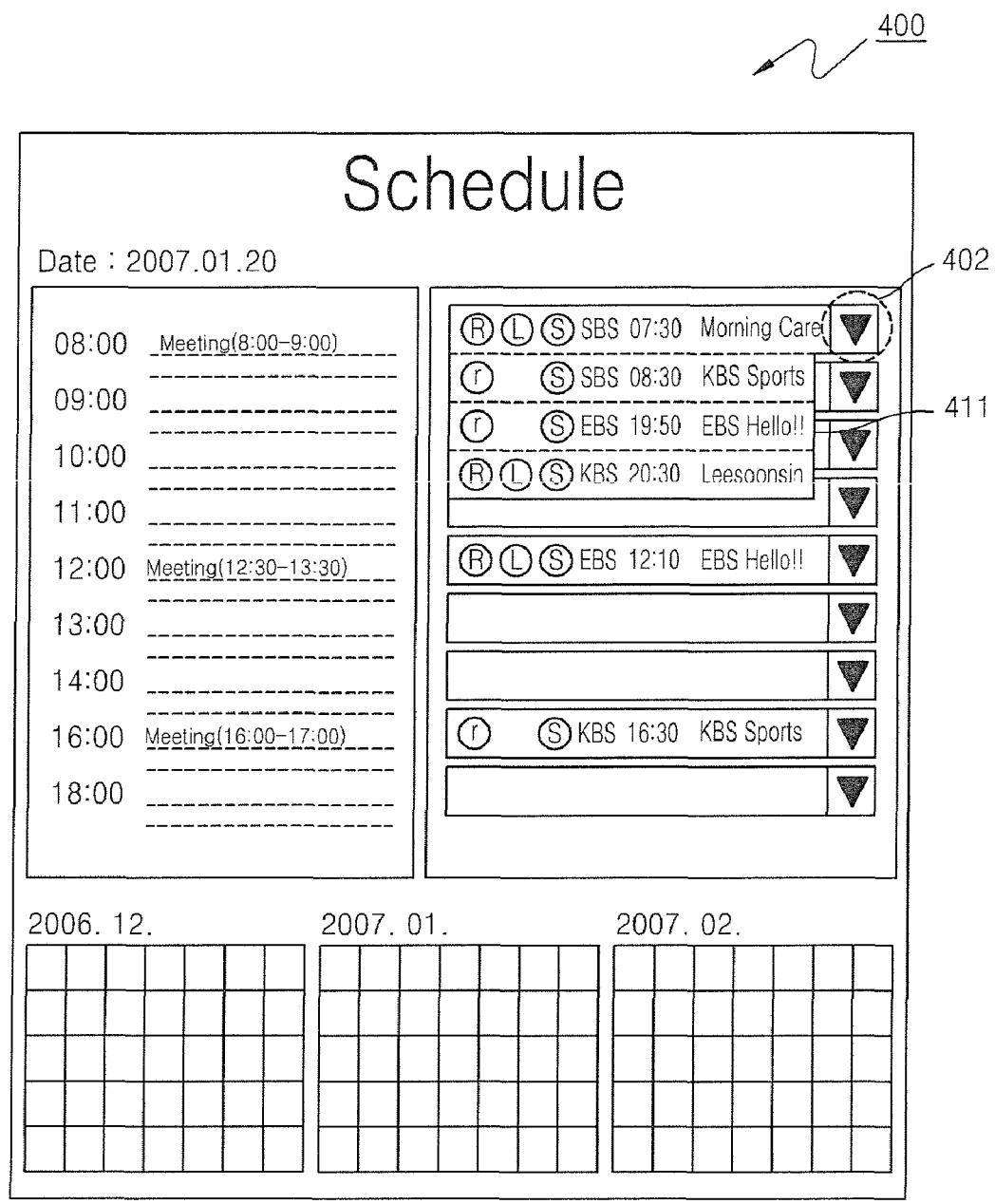

FIGS. 4A and 4B illustrate a window 400 for managing a personal schedule and broadcasting programs according to still another embodiment of the present invention. In FIG. 4A, a list 401 of broadcasting programs which overlap with a personal schedule is displayed at the right side of a daily personal schedule 404. In a case where there are one or more broadcasting programs during a time period which overlaps with the personal schedule, when an arrow 402 is pressed, additional broadcasting programs that are not displayed are displayed as illustrated by a reference numeral 411 of FIG. 4B. When there is no broadcasting program which overlaps with the personal schedule, an item of the list may be represented as a NULL state as illustrated by a reference numeral 403.

Figure 5A:
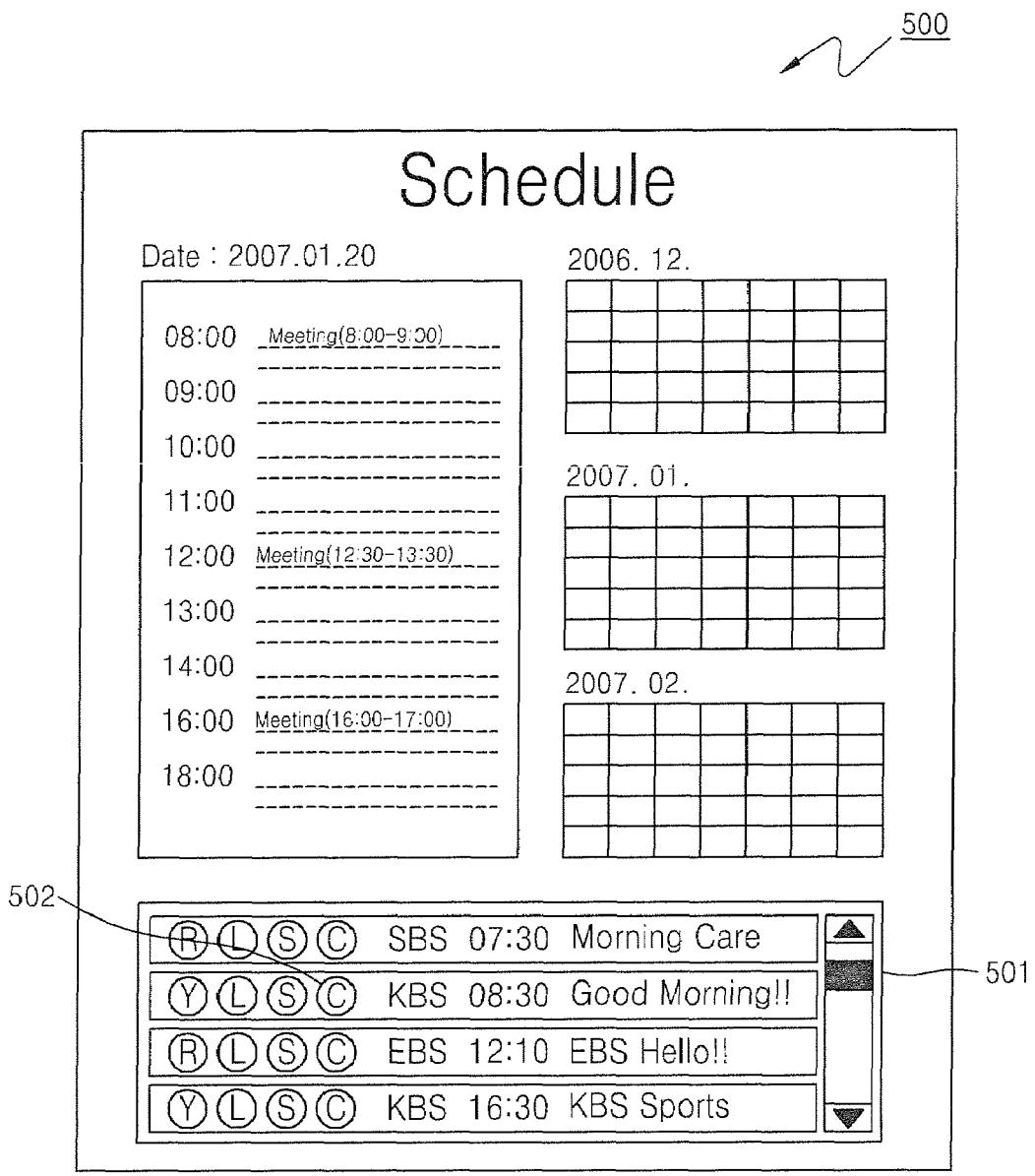
FIGS. 5A to 5C illustrate a window for displaying comments on broadcasting programs in a window for managing personal schedule and broadcasting programs according to an embodiment of the present invention.
Figure 5B:
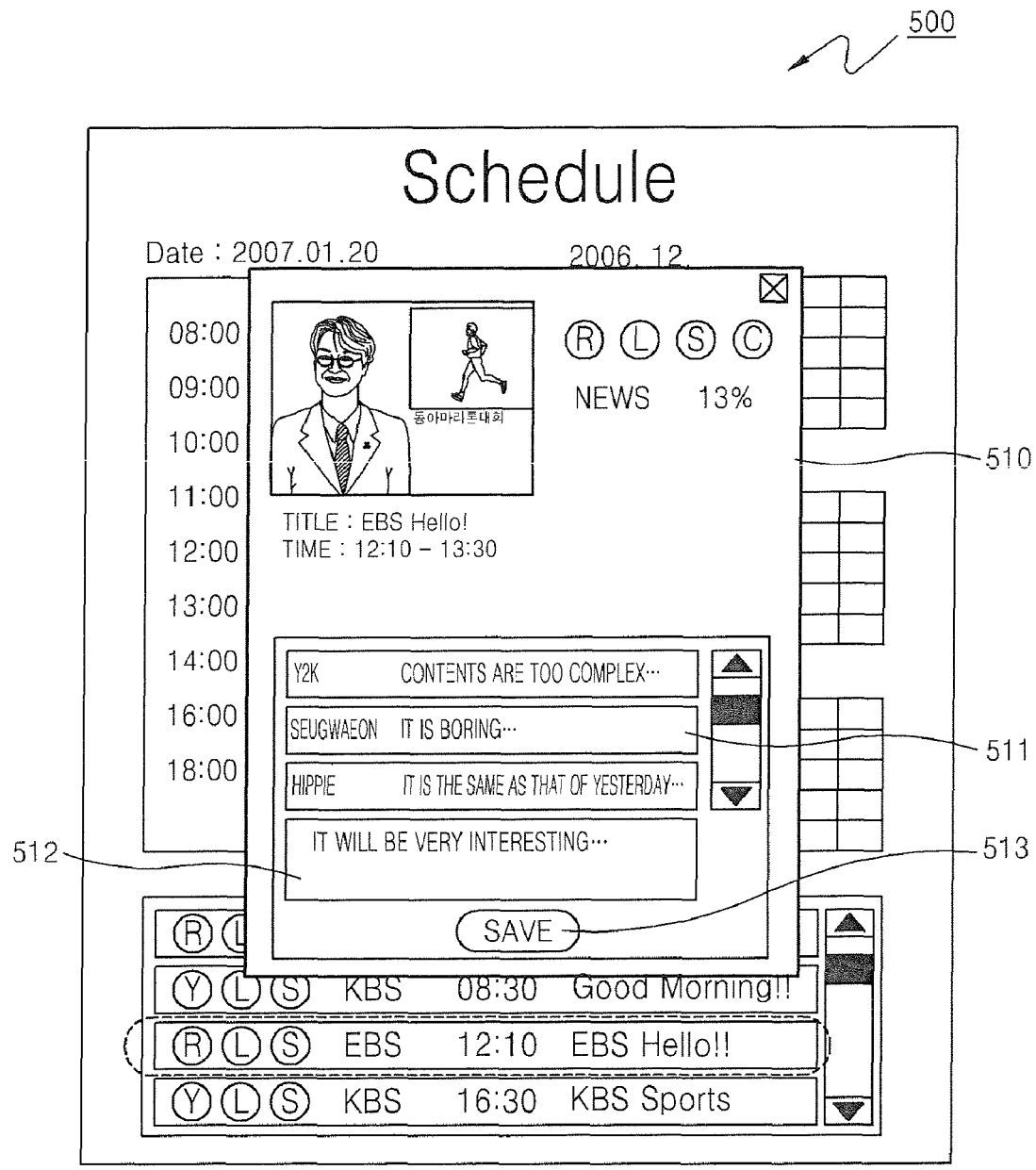
Figure 5C:
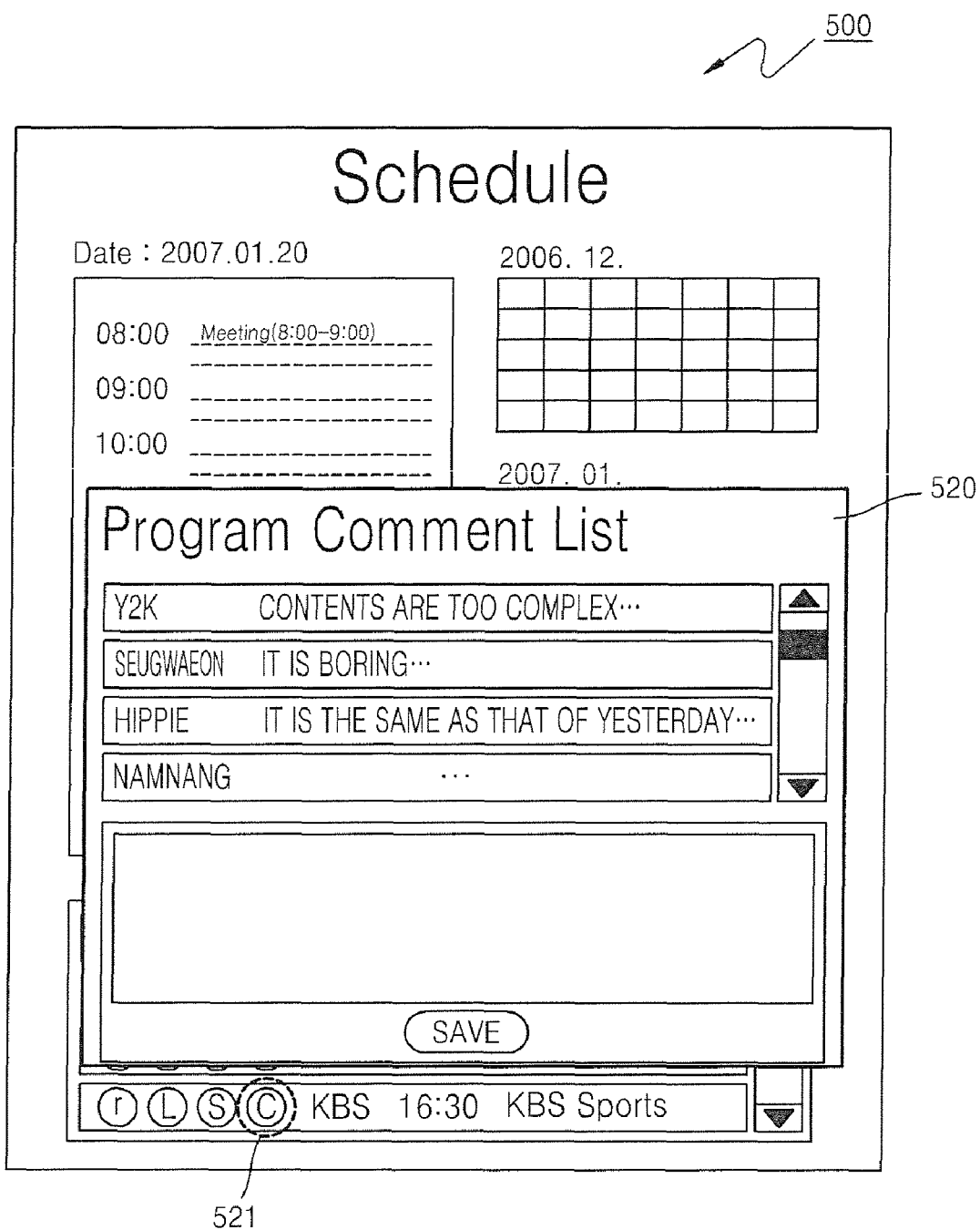

FIGS. 5A, 5B and 5C illustrate a sub-window 500 for displaying comments on broadcasting programs in the window 200 for managing a personal schedule and broadcasting programs according to an embodiment of the present invention. In FIG. 5A, a C icon 502 for representing a comment on a corresponding broadcasting program is included in a broadcasting program list 501. According to aspects of the present invention, it is possible to easily view comments for representing opinions of viewers such as feelings, reviews, criticism, etc. on the broadcasting program in the information on the broadcasting programs which is displayed in an application for managing the personal schedule. It is also possible for a user to input comments on broadcasting programs.

FIG. 5B illustrates a window 510 on which detailed information on the broadcasting program is displayed when the user selects a broadcasting program, such as, for example, "EBS Hello!" The window 510 may include many different types of information related to the displayed broadcasting program. For example, the labels, "NEWS" and "13%" in FIG. 5B represent information on genres and ratings of a news broadcasting program with a 13% rating. It is understood that many different kinds of information may be displayed in the window 510 in addition to genres and ratings, such as actors, locations, trivia about the broadcasting program, etc.

In the window 510 of FIG. 5B, comments of viewers on the selected broadcasting program and IDs of the viewers are displayed as illustrated by a reference numeral 511. In addition, the user can position a cursor on a window 512 for inputting comments and can input comments on the selected broadcasting program. A SAVE icon 513 is used to store the input comments.

FIG. 5C illustrates a window 520 displayed when the user selects a C icon included in items of information on a predetermined broadcasting program. When the user selects a C icon 521, a list of comments of viewers on the selected program is displayed on the window 520. As illustrated in FIG. 5B, the user can view comments of other viewers on the broadcasting program or input comments on the broadcasting program via the window 520.

Figure 6A:
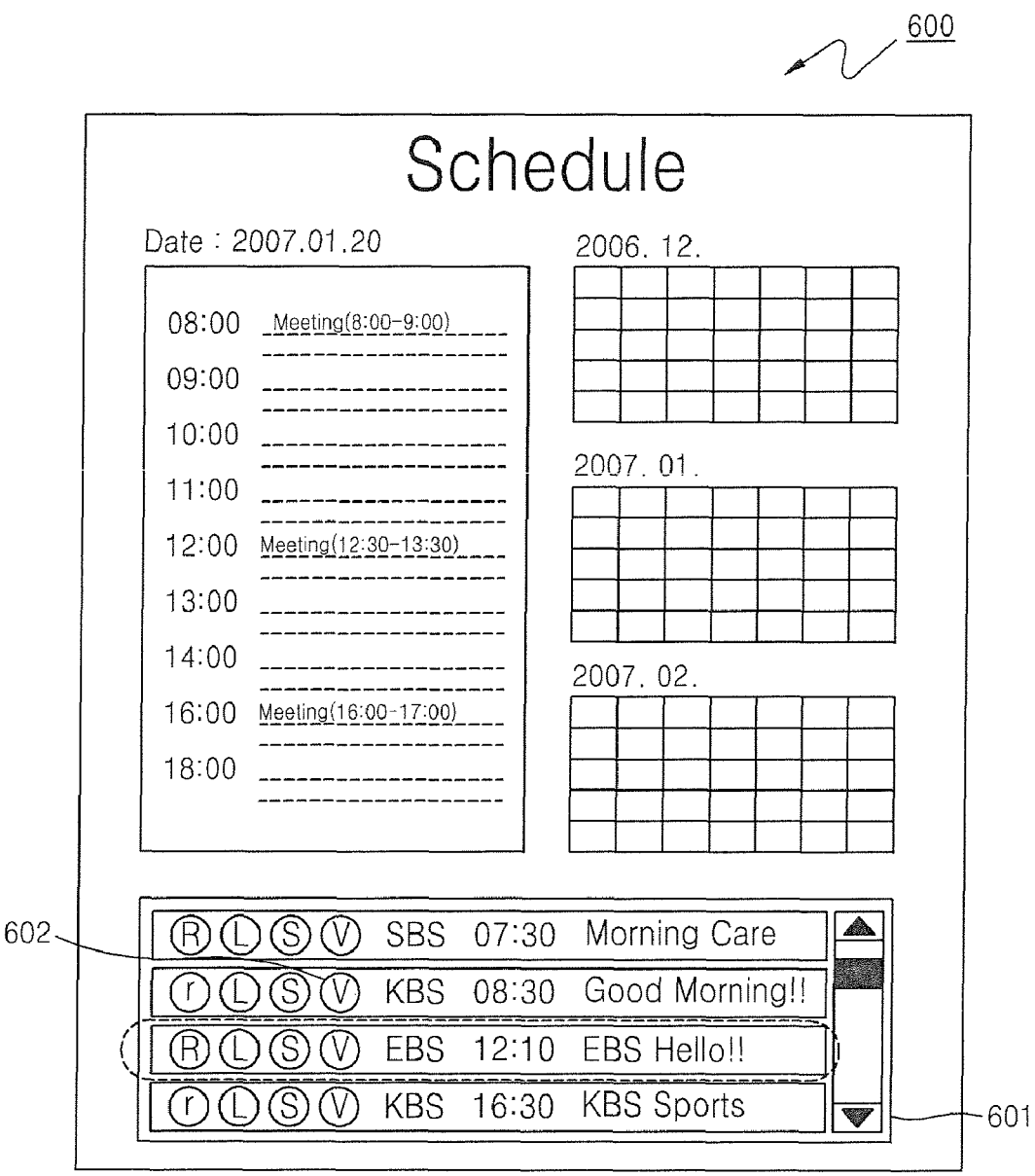
FIGS. 6A to 6D illustrate a window for providing VOD services in a window for managing personal schedule and broadcasting programs according to an embodiment of the present invention.

FIGS. 6A, 6B, 6C and 6D illustrate a window 600 for providing VOD services according to an embodiment of the present invention. In FIG. 6A, a V icon 602 for providing a VOD service on each broadcasting program is added to a broadcasting program list 601. According to aspects of the present invention, a user can choose to receive a VOD list related to a predetermined broadcasting program or purchase a predetermined VOD included in the VOD list by using an icon for providing a VOD service included in information on broadcasting programs.

Figure 6B:
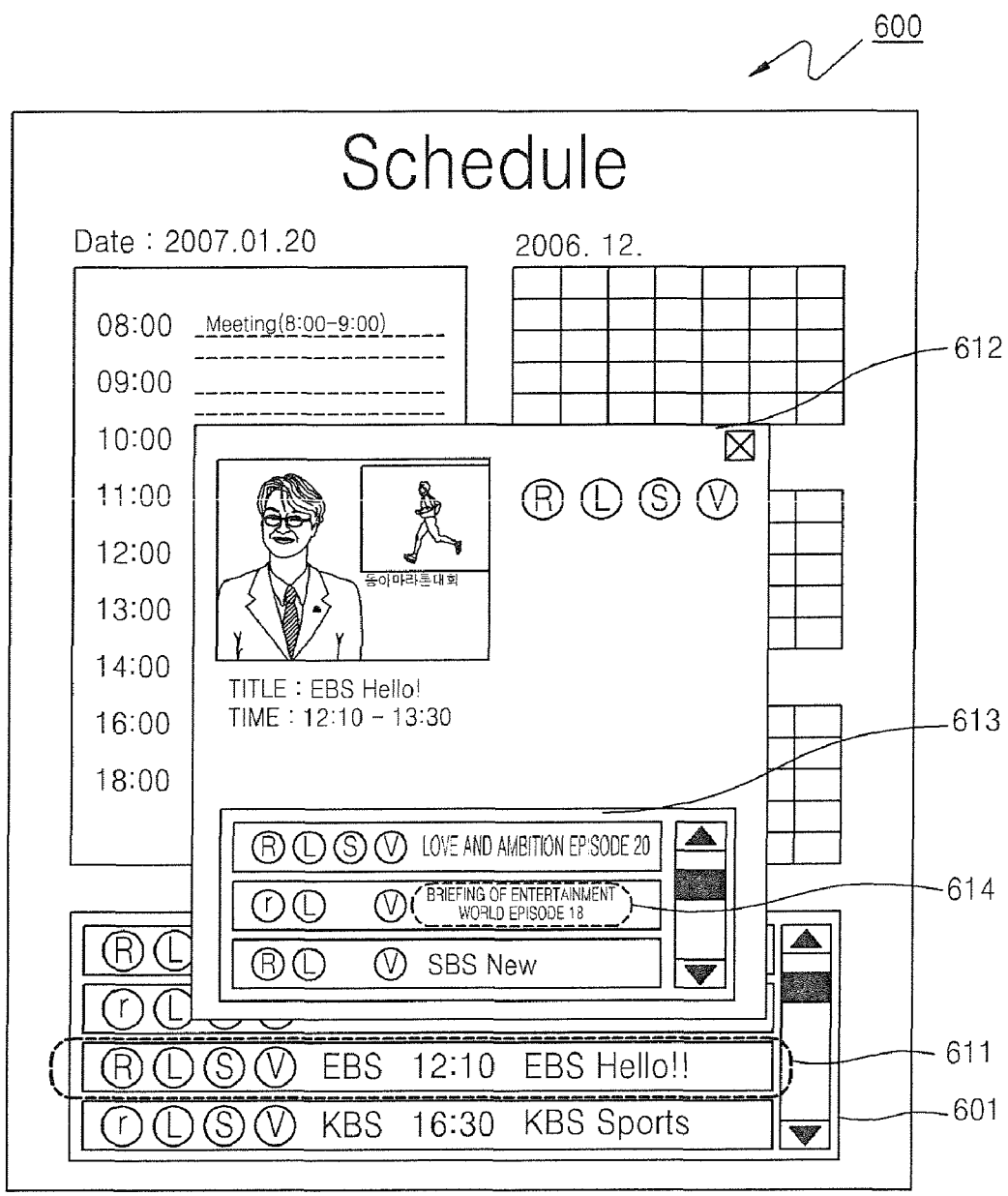

FIG. 6B illustrates detailed information on a selected broadcasting program when a user selects a predetermined broadcasting program 611 from a broadcasting program list 601. As shown in FIG. 6B, when the user selects a broadcasting program, for example, the broadcasting program 'EBS Hello!' 611, a window 612 including detailed information on the selected broadcasting program is displayed. In the window 612 for displaying the detailed information on the selected broadcasting program, information 613 on the VOD list related to the selected broadcasting program is displayed. When the user selects a broadcasting program as illustrated by a reference numeral 614 from the VOD list 613, VOD data for the broadcasting program is received from a server (not shown) for providing a VOD service.

Figure 6C:
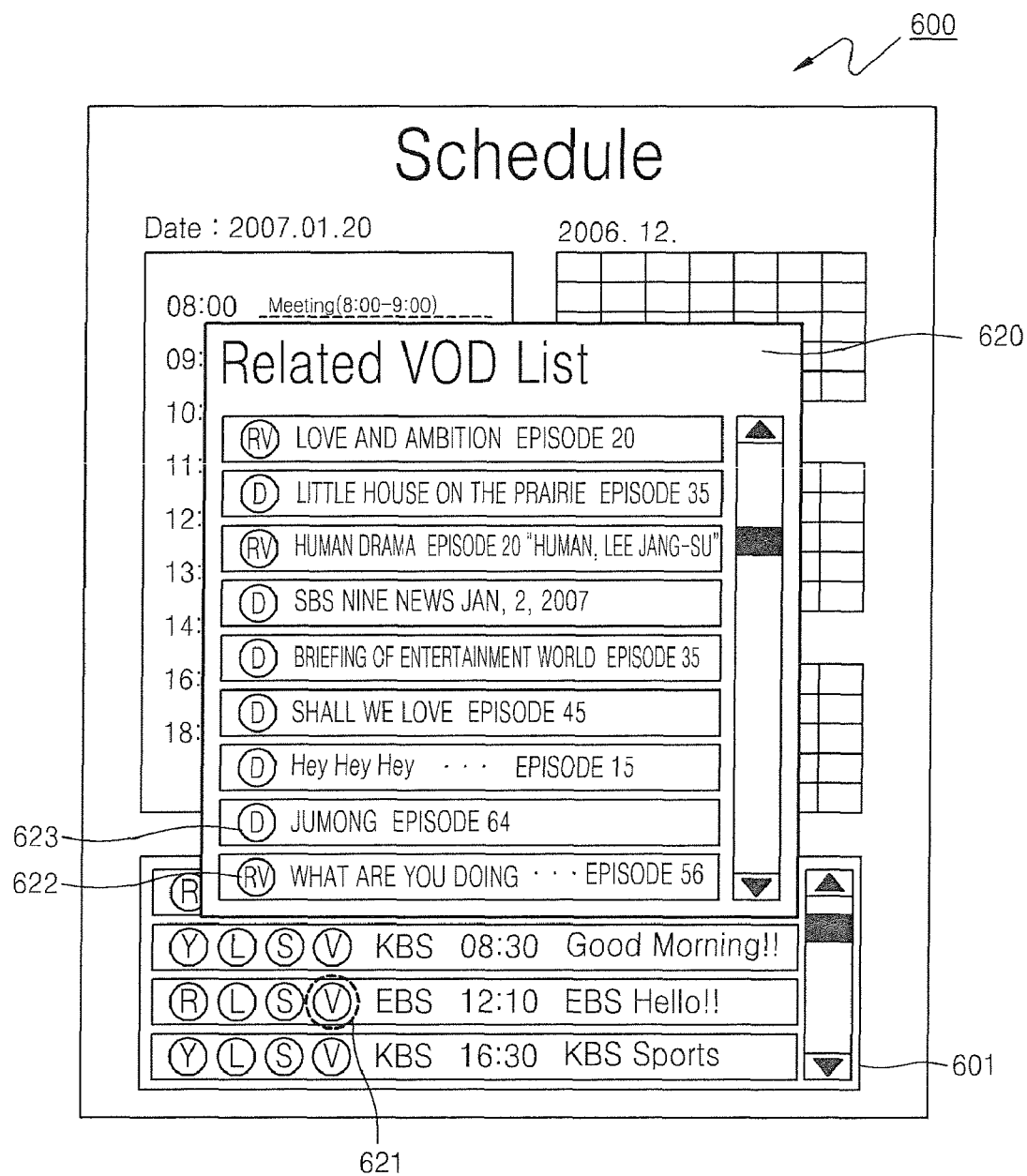

FIG. 6C illustrates a window 620 displayed when the user selects a V icon 621 from a predetermined item included in the broadcasting program list 601. In FIG. 6C, when the user selects the V icon 621 of the broadcasting program 'EBS Hello!,' a window 620 for displays a VOD list related to the broadcasting program. An RV icon 622 in the window 620 indicates that the corresponding broadcasting program is completely downloaded and stored in the memory 180. A D icon 623 in the window 620 indicates that a download service for the corresponding broadcasting program is provided.

Figure 6D:
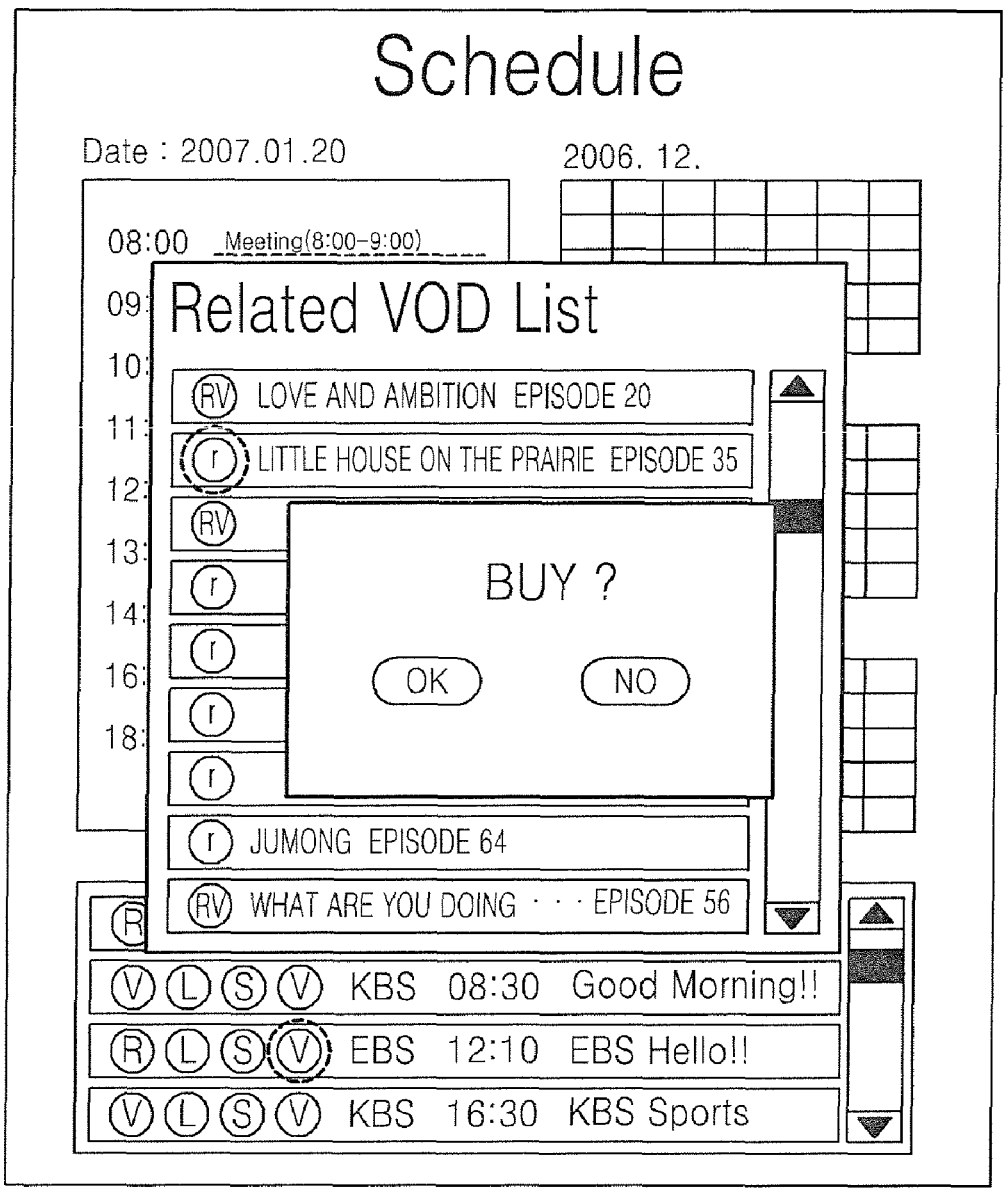

As shown in FIG. 6D, when the user selects the D icon 623, a window displaying icons which enable a user to purchase the broadcasting program is provided. When the user chooses to purchase the broadcasting program, the apparatus 100 receives the VOD from the server and transmits the VOD service to the user.

Figure 7A:
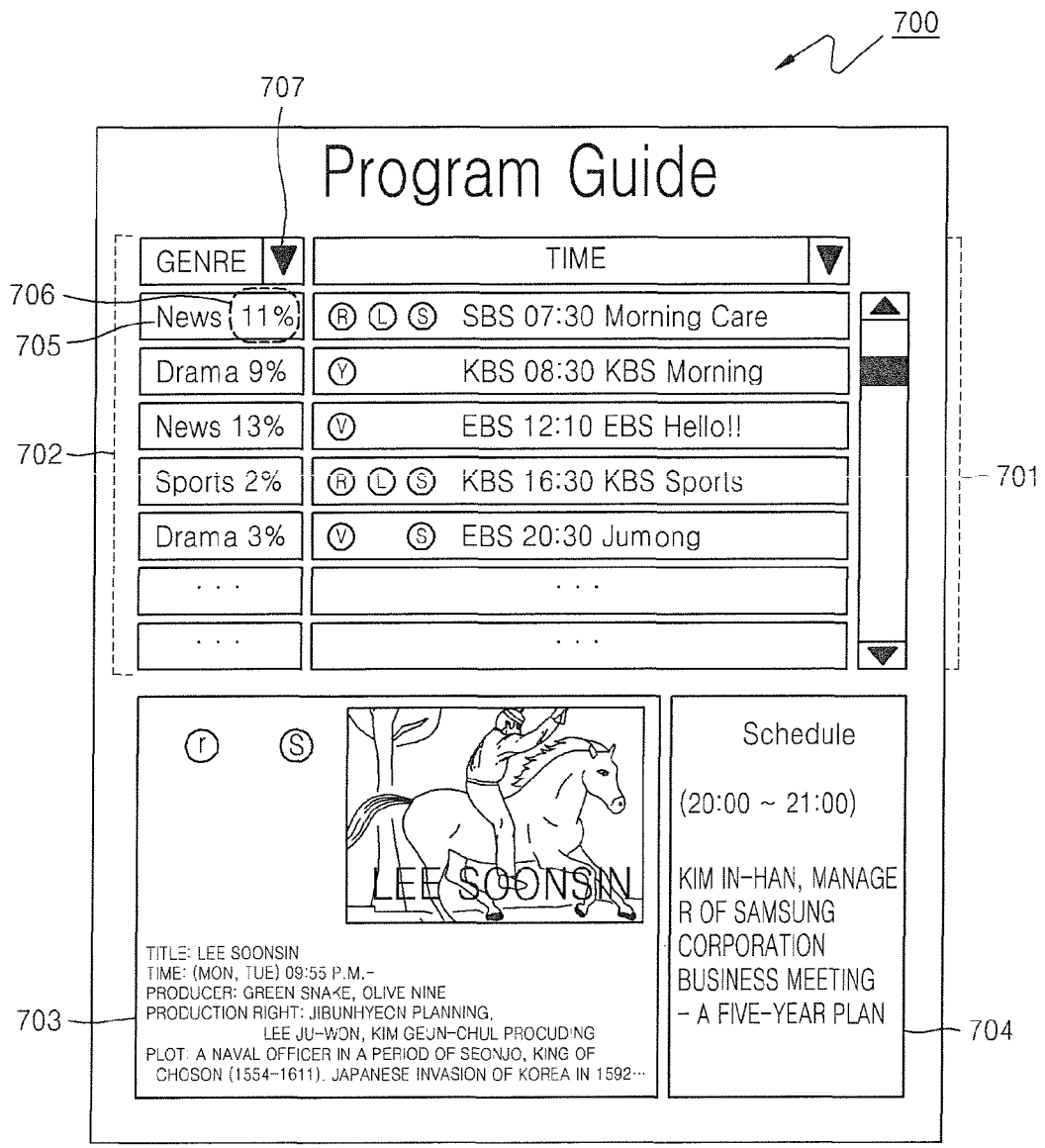
FIGS. 7A and 7B illustrate a window for managing a personal schedule while executing an application for managing broadcasting programs according to an embodiment of the present invention.

FIGS. 7A to 8B illustrate windows 700 and 800 for managing a personal schedule in an application for managing broadcasting programs provided with the apparatus 100. FIGS. 7A and 7B illustrate the window 700 for managing a personal schedule while executing an application for managing broadcasting programs according to an embodiment of the present invention.

In FIG. 7A, the window 700 for managing a personal schedule is constructed with a basic information display component 701 to display basic information on broadcasting programs, a detailed information display component 703 to display detailed information on a selected broadcasting program, and a personal schedule block 704. When the user selects a broadcasting program from the basic information block 701, detailed information on the selected broadcasting program is displayed in the detailed information block 703 on the broadcasting program, and a personal schedule which overlaps with the broadcasting program is displayed in the personal schedule block 704.

As shown in FIG. 7A, the left block 702 of the basic information block 701 provides information on various characteristics of the broadcasting programs, including, for example, a genre 705 of the program and a preference, such as a rating 706, based on factors such as the genre or the number of downloads of the broadcasting program in the case of the VOD service. In addition, the basic information block 701 includes the R icon 209 indicating information on recording of a broadcasting program, the L icon 206 for outputting a program list, and an S icon 207 for representing whether a broadcasting program overlaps with a personal schedule.

Figure 7B:
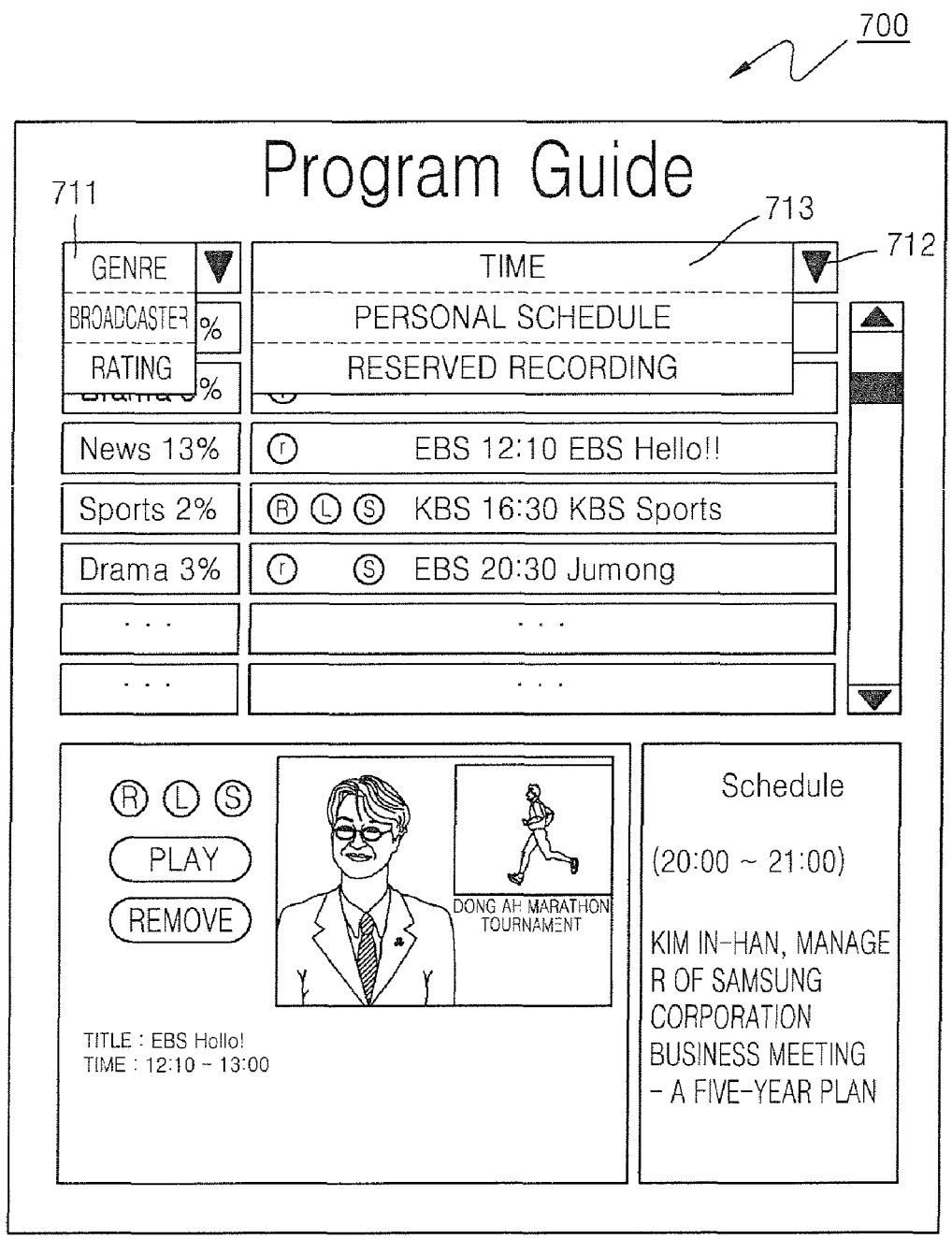

In FIG. 7A, when an arrow 707 in the left block 702 is pressed or selected, as illustrated by a reference numeral 711 of FIG. 7B, an alignment condition such as a genre, a broadcaster, or a rating is displayed. A broadcasting program list is output based on a selected alignment condition. When an arrow 712 in the basic information block 701 is pressed, a broadcasting program list is displayed based on an alignment condition 713 such as a time, personal schedule, or reserved recording. For example, when the user selects the personal schedule, broadcasting programs which overlap with the personal schedule are listed in chronological order. When the user selects the reserved recording, broadcasting programs of which recording is reserved are listed in chronological order. It is understood that other alignment conditions may also be used, such as actors, network information, etc.

Figure 8A:
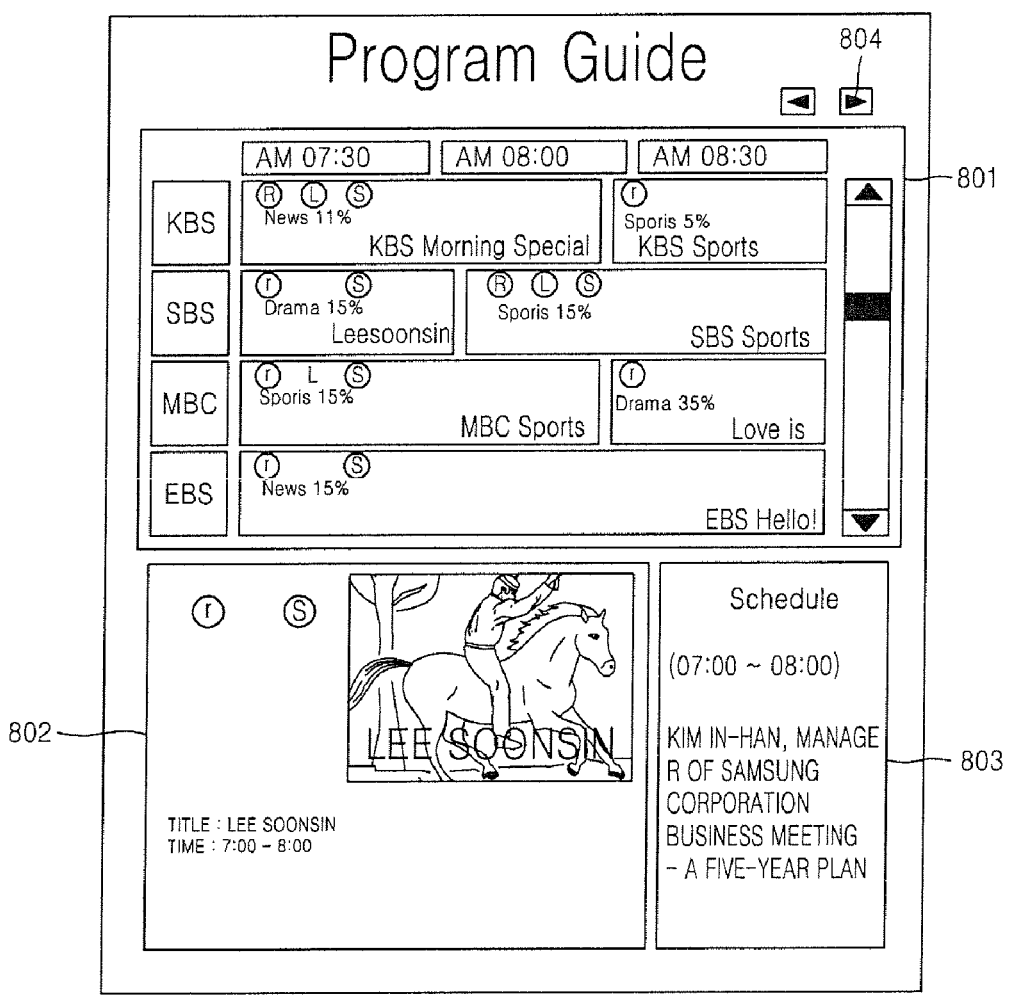
Figure 8B:
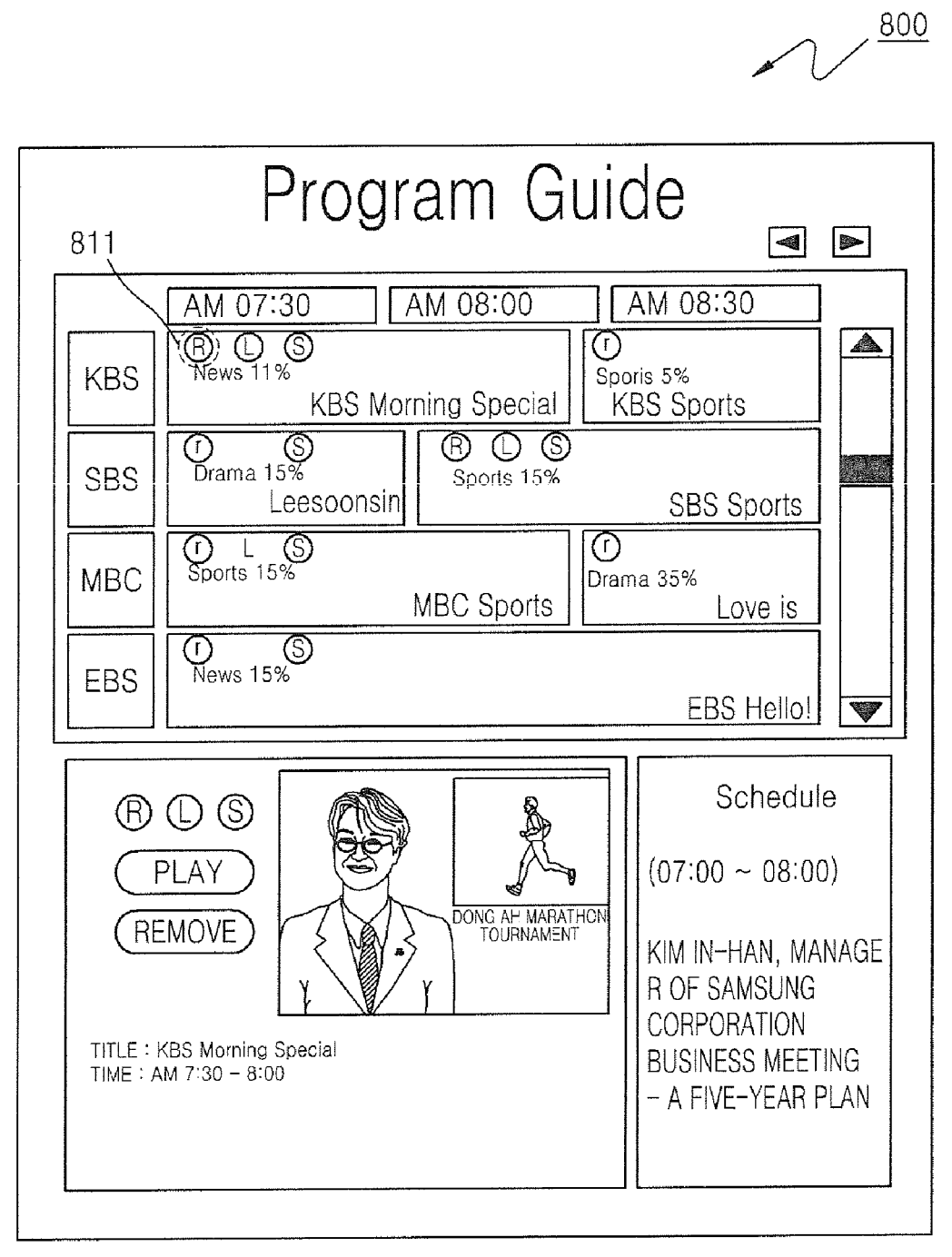

FIGS. 8A and 8B illustrate a window 800 for managing a personal schedule while executing an application for managing broadcasting programs according to another embodiment of the present invention. FIG. 8A illustrates a window 800 constructed with a basic information display component 801 to display basic information on broadcasting programs, a detailed information display component 802 to display detailed information on a broadcasting program, and a personal schedule information block 803. When the user selects a broadcasting program from the basic information block 801 on the broadcasting programs, detailed information on the selected broadcasting program is displayed in the detailed information block 802, and a personal schedule which overlaps with the selected broadcasting program is displayed in the personal schedule block 803.

Since information on each of the broadcasting programs is not provided in the window 800 shown in FIG. 8A due to the limit of the window size, information on programs broadcasted for a relatively short amount of time, such as an hour, is displayed. The user can view information on programs broadcasted during another period by using an icon 804 having an arrow shape, a circular shape, or any other shape commonly used to navigate a display window. As shown in FIG. 8B, when the user presses an R icon 811 indicating that a corresponding broadcasting program is already recorded, PLAY and REMOVE icons are displayed on a detailed information block 812 on a broadcasting program.

Figure 9:
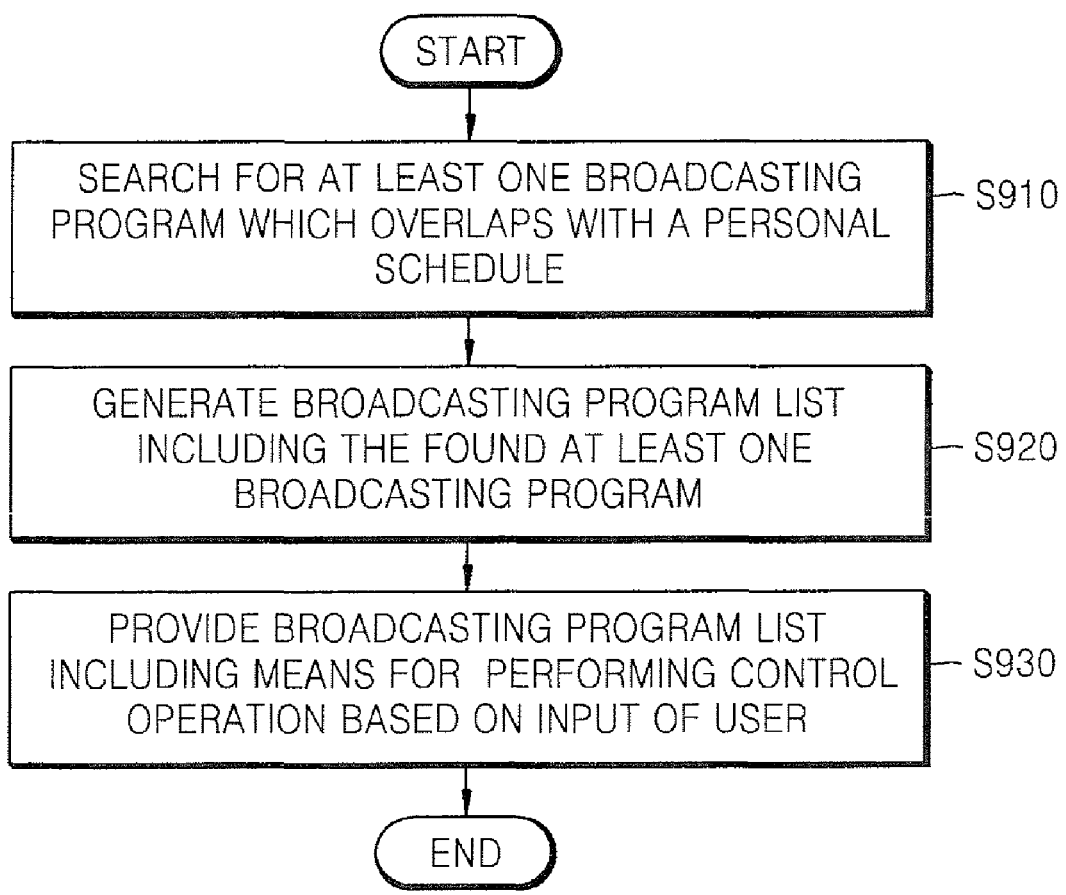
FIG. 9 is a flowchart illustrating a method of managing a personal schedule and broadcasting programs according to an embodiment of the present invention.

FIG. 9 is a flowchart illustrating a method of managing a personal schedule and broadcasting programs according to an embodiment of the present invention. In operation S910, at least one broadcasting program which overlaps with a personal schedule is searched for. In operation S920, a broadcasting program list including the found at least one broadcasting program is generated.

In operation S930, at least one list for representing a personal schedule and a broadcasting program list are displayed. At this time, the information on the broadcasting program included in the broadcasting program list is displayed together with display components for performing control operations based on input commands input by the user so as to allow the user to perform operations related to the broadcasting programs. According to an aspect of the present invention, the display components for performing the control operations based on the inputs of the user are icons which are displayed together with the broadcasting program list.

The broadcasting program list is updated whenever the personal schedule is changed due to a user inputting a new entry, deleting an existing entry, or otherwise modifying the schedule. Accordingly, when the user changes the personal schedule, a broadcasting program list including information on broadcasting programs which overlap with the changed personal schedule is generated.

When receiving an input signal of the user for selecting a broadcasting program from the broadcasting program list, detailed information on the selected broadcasting program is displayed together with display components for performing control operations based on inputs of the user for the selected broadcasting program. The display components for performing control operations in response to the input commands input by the user include display components for performing at least one operation among operations of recording the broadcasting program, displaying the broadcasting program list, providing a comment service on the broadcasting program, or providing a VOD service related to the broadcasting program. However, it is understood that other aspects of the present invention may include additional display components for performing additional operations not listed above, such as, for example, other pay-per-view services, etc.

The operation of recording the broadcasting program may be implemented in various ways. For example, the operation may include a function which records the entire broadcasting program, or a function which starts recording the broadcasting program. When providing the broadcasting program list, the control unit 140 provides information on whether a broadcasting program corresponding to the information on the broadcasting program included in the broadcasting program list overlaps with the personal schedule and information for representing whether the broadcasting program is recorded. When the broadcasting program has been already recorded, an icon for allowing the user to delete the broadcasting program is further displayed.

According to an aspect of the present invention, the operation of providing the comment service on the broadcasting program includes an operation of obtaining comments on the broadcasting program by accessing a server for providing a comment service on the broadcasting program and an operation of providing an input window for allowing the user to input a comment. It is understood that the comment service may include other functions as well, such as displaying multiple input windows, additional chat rooms, etc.

In addition, the operation of providing a VOD service related to the broadcasting program includes an operation of displaying a VOD service list so that the user can select a VOD service related to the broadcasting program. When providing the VOD service list, the control unit 140 provides information on whether broadcasting programs corresponding to information on the broadcasting programs included in the VOD service list are stored and display components for receiving a VOD included in the VOD service in response to an input command input by the user.

Aspects of the present invention can also be embodied as computer readable codes on a computer readable recording medium. Codes and code segments for accomplishing the program can be easily construed by programmers skilled in the art to which aspects of the present invention pertain. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical disks, and flash memories. The computer readable recording medium can also be distributed over network coupled computer systems so that the computer readable code is stored and executed in a distributed fashion.

As described above, aspects of the present invention provide an apparatus and method for managing desired programs to suit a personal schedule by collectively managing the personal schedule and broadcasting programs. In addition, since information on broadcasting programs included in a broadcasting program list is displayed together with display components for performing control operations in response to input commands input by the user, it is possible to perform operations related to the broadcasting program by allowing the user to input an input signal once in a state where the broadcasting program list is displayed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing a schedule and programs, the method comprising:
   providing a personal schedule and which includes one or more non-broadcasting program events;
   finding at least one broadcasting program which overlaps with the personal schedule;
   searching for basic information for the at least one broadcasting program; and
   providing a list including a title of the at least one broadcasting program,
   the basic information, and display components for performing a control operation related to the at least one broadcasting program in response to an input signal,
   wherein at least one broadcast program which does not overlap with the personal schedule is excepted from the list.

2. The method of claim 1, wherein the display component comprises an icon displayed together with the basic information for the at least one broadcasting program.

3. The method of claim 1, further comprising, when the input signal for selecting the at least one broadcasting program from the list is received, providing detailed information on the selected at least one broadcasting program.

4. The method of claim 1, further comprising, when the personal schedule is changed, updating the list.

5. The method of claim 1, wherein the personal schedule is from a past date.

6. The method of claim 1, wherein using the display component for performing the control operation comprises selecting an operation selectable between recording the at least one broadcasting program, providing a comment service on the at least one broadcasting program, and providing a video on demand (VOD) service related to the at least one broadcasting program.

7. The method of claim 6, wherein the operation of recording the at least one broadcasting program includes at least one of an operation of recording the entire at least one broadcasting program or an operation of starting to record the at least one broadcasting program.

8. The method of claim 6, wherein the operation of providing the comment service on the at least one broadcasting program includes an operation of obtaining a comment on the at least one broadcasting program by accessing a server which provides the comment service on the at least one broadcasting program and an operation of displaying a display window for inputting another comment.

9. The method of claim 6, wherein the operation of providing the VOD service comprises displaying a VOD service list including information about the VOD service related to the at least one broadcasting program so that a user may select the VOD service from the VOD service list.

10. The method of claim 9, wherein the providing of the VOD service list further comprises displaying third information indicating whether the at least one broadcasting program is stored and displaying another display component for receiving a VOD included in the VOD service list in response to another input signal.

11. The method of claim 1, wherein the providing of the list comprises displaying information indicating whether the at least one broadcasting program has already been recorded, and
   when the information indicates that the at least one broadcasting program has already been recorded, the method further comprises displaying an icon to delete the at least one broadcasting program.

12. An apparatus for managing a schedule and programs, the apparatus comprising:
   a schedule management unit to manage a personal schedule including one or more non broadcasting program events;
   a broadcasting program management unit to manage basic information of broadcasting programs;
   an interface unit which receives an input signal; and
   a control unit which finds a at least one broadcasting program among the broadcasting programs which overlaps with the personal schedule managed by the schedule management unit, searches for the basic information for the at least one broadcasting program, and provides a list including a title of the at least one broadcasting program, the basic information, and display components for performing a control operation related to the at least one broadcasting program and which is activated in response to the input signal,
   wherein at least one broadcast program which does not overlap with the personal schedule is excepted from the list.

13. The apparatus of claim 12, wherein the display component comprises an icon displayed together with the basic information for the at least one broadcasting program.

14. The apparatus of claim 12, wherein when the input signal for selecting the at least one broadcasting program from the list is received, the control unit provides detailed information on the selected at least one broadcasting program.

15. The apparatus of claim 12, wherein the control unit updates the list when the personal schedule is changed.

16. The apparatus of claim 12,
   wherein the personal schedule is from a past date.

17. The apparatus of claim 12, further comprising a broadcasting data processing unit which receives and processes broadcasting data,
   wherein the control unit performs an operation of recording the at least one broadcasting program formed of the processed broadcasting data in response to the input signal.

18. The apparatus of claim 17, wherein the operation of recording the at least one broadcasting program includes at least one of an operation of recording the entire at least one broadcasting program or an operation of starting to record the at least one broadcasting program.

19. The apparatus of claim 12,
   wherein when the control unit provides the list, the control unit provides information indicating whether the at least one broadcasting program has already been recorded, and
   when the information indicates that the at least one broadcasting program has already been recorded, the control unit further provides an icon to delete the at least one broadcasting program.

20. The apparatus of claim 12, further comprising a communication unit for communicating with a server that provides at least one of a comment service for the at least one broadcasting program and/or a video on demand (VOD) service related to the at least one broadcasting program through a communication network,
   wherein the control unit performs at least one of an operation of providing the comment service on the at least one broadcasting program or an operation of providing the VOD service related to the at least one broadcasting program in response to the input signal.

21. The apparatus of claim 20, wherein the operation of providing the comment service on the at least one broadcasting program includes an operation of obtaining a comment on the at least one broadcasting program by accessing the server and an operation of displaying a display window for inputting another comment.

22. The apparatus of claim 20, wherein the operation of providing the VOD service related to the at least one broadcasting program includes an operation of displaying a VOD service list including information about the VOD service related to the at least one broadcasting program so that a user may select the VOD service from the VOD service list.

23. The apparatus of claim 22, wherein when the VOD service list is displayed, third information is displayed indicating whether the at least one broadcasting program is stored and displaying another display component for receiving a VOD included in the VOD service list in response to another input signal.

24. A computer-readable recording medium having embodied thereon a computer program for executing a method of managing a schedule and programs, the method comprising:
    providing a personal schedule and which includes one or more non-broadcasting program events;
    finding at least one broadcasting program which overlaps with the personal schedule;
    searching for basic information for the at least one broadcasting program; and
    providing a list including the title of the at least one broadcasting program, the basic information, and display components for performing a control operation related to the at least one broadcasting program in response to an input signal,
    wherein at least one broadcast program which does not overlap with the personal schedule is excepted from the list.

25. A method of managing a schedule and programs in a portable device, the method comprising:
    searching broadcasting programs for at least one overlapping broadcasting program which overlaps with a portion of entries corresponding to designated times entered into a personal schedule, the entries in the personal schedule not being related to the at least one broadcasting program;
    simultaneously displaying the personal schedule and a list of titles of the at least one overlapping broadcasting program;
    wherein the list further includes the basic information of the at least one overlapping broadcasting program and a display component for performing a control operation related to the at least one overlapping broadcasting program in response to an input signal,
    wherein at least one broadcast program which does not overlap with the personal schedule is excepted from the list.

* * * * *